US012347032B2

(12) United States Patent
Cheng et al.

(10) Patent No.: US 12,347,032 B2
(45) Date of Patent: Jul. 1, 2025

(54) FACIAL TEXTURE SYNTHESIS FOR THREE-DIMENSIONAL MORPHABLE MODELS

(71) Applicant: QUALCOMM Incorporated, San Diego, CA (US)

(72) Inventors: Ke-Li Cheng, San Diego, CA (US); Anupama S, Chennai (IN); Kuang-Man Huang, Zhubei (TW); Chieh-Ming Kuo, Taoyuan (TW); Avani Rao, Bangalore (IN); Chiranjib Choudhuri, Bangalore (IN); Michel Adib Sarkis, San Diego, CA (US); Ning Bi, San Diego, CA (US); Ajit Deepak Gupte, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/813,556

(22) Filed: Jul. 19, 2022

(65) Prior Publication Data

US 2024/0029354 A1 Jan. 25, 2024

(51) Int. Cl.
*G06T 17/00* (2006.01)
*G06T 15/04* (2011.01)
(Continued)

(52) U.S. Cl.
CPC .............. *G06T 17/10* (2013.01); *G06T 15/04* (2013.01); *G06T 17/00* (2013.01);
(Continued)

(58) Field of Classification Search
None
See application file for complete search history.

(56) References Cited

U.S. PATENT DOCUMENTS 7,133,052 B1 * 11/2006 Silva .................... G06T 15/50
345/646
2019/0342507 A1 * 11/2019 Dye ..................... G06T 13/40
(Continued)

OTHER PUBLICATIONS

Yajie Zhao, "3D Human Face Reconstruction and 2D Appearance Synthesis", 2018, Thesis and Dissertations—Computer Science. 66, University of Kentucky, Lexington, Kentucky (Year: 2018).*
(Continued)

*Primary Examiner* — Michael J Cobb
(74) *Attorney, Agent, or Firm* — Polsinelli/Qualcomm

(57) ABSTRACT

Systems and techniques are provided for generating a texture for a three-dimensional (3D) facial model. For example, a process can include obtaining a first frame, the first frame including a first portion of a face. In some aspects, the process can include generating a 3D facial model based on the first frame and generating a first facial feature corresponding to the first portion of the face. In some examples, the process includes obtaining a second frame, the second frame including a second portion of the face. In some cases, the second portion of the face at least partially overlaps the first portion of the face. In some examples, the process includes combining the first facial feature with the second facial feature to generate an enhanced facial feature, wherein the combining is performed to enhance an appearance of select areas of the enhanced facial feature.

30 Claims, 12 Drawing Sheets

(51) Int. Cl.
   *G06T 17/10*     (2006.01)
   *G06V 10/77*     (2022.01)
   *G06V 40/16*     (2022.01)
(52) U.S. Cl.
   CPC ........ *G06V 10/7715* (2022.01); *G06V 40/171* (2022.01); *G06T 2200/08* (2013.01)

(56) References Cited

U.S. PATENT DOCUMENTS

2021/0390767 A1   12/2021   Johnson et al.
2022/0092853 A1   3/2022    Booth et al.

OTHER PUBLICATIONS

Narendra Patel et al., "3D Facial Model Construction and Expressions Synthesis using a Single Frontal Face Image," 2010, International Journal of Graphics, 1(1):1-18 (Year: 2010).*
Jianwen Lou et al. "Realistic Facial Expression Reconstruction for VR HMD Users," 2020, IEEE Transactions on Multimedia, 22(3):730-743 (Year: 2020).*
Alexandru Ichim et al. "Dynamic 3D Avatar Creation from Handheld Video Input", 2015, ACM Transactions on Graphics, 34(4): Article 45 (Year: 2015).*
Hu Y., et al., "Automatic 3D Reconstruction for Face Recognition", Automatic Face and Gesture Recognition, 2004, Proceedings of Sixth IEEE International Conference on, IEEE, Piscataway, NJ, USA, May 17, 2004, 6 Pages, XP010949538, ISBN: 978-0-7695-2122-0, Abstract Section 2 .1. 2D-to-3D Integrated Face Reconstruction.
International Search Report and Written Opinion—PCT/US2023/067359—ISA/EPO—Aug. 28, 2023.

* cited by examiner

FACIAL TEXTURE SYNTHESIS FOR THREE-DIMENSIONAL MORPHABLE MODELS

FIELD

The present disclosure generally relates to systems and techniques for generating three-dimensional (3D) models. For example, aspects of the present disclosure relate to performing facial texture synthesis for 3D models (e.g., 3D morphable models), such as for faces or other objects.

BACKGROUND

Many devices and systems allow a scene to be captured by generating frames (also referred to as images) and/or video data (including multiple images or frames) of the scene. For example, a camera or a computing device including a camera (e.g., a mobile device such as a mobile telephone or smartphone including one or more cameras) can capture a sequence of frames of a scene. The frames and/or video data can be captured and processed by such devices and systems (e.g., mobile devices, IP cameras, etc.) and can be output for consumption (e.g., displayed on the device and/or other device). In some cases, the frame and/or video data can be captured by such devices and systems and output for processing and/or consumption by other devices.

A frame can be processed (e.g., using object detection, recognition, segmentation, etc.) to determine objects that are present in the frame, which can be useful for many applications. For instance, a model can be determined for representing an object in a frame and can be used to facilitate effective operation of various systems. Examples of such applications and systems include augmented reality (AR), robotics, automotive and aviation, three-dimensional scene understanding, object grasping, object tracking, in addition to many other applications and systems.

SUMMARY

Disclosed are systems, apparatuses, methods, and computer-readable media for generating a texture for a three-dimensional (3D) facial model. According to at least one example, a method is provided for generating a texture for a 3D facial model. The method includes: obtaining a first frame, the first frame including a first portion of a face; generating a 3D facial model based on the first frame; generating a first facial feature corresponding to the first portion of the face; obtaining a second frame, the second frame including a second portion of the face, wherein the second portion of the face at least partially overlaps the first portion of the face; generating a second facial feature corresponding to the second portion of the face; and combining the first facial feature with the second facial feature to generate an enhanced facial feature, wherein the combining is performed to enhance an appearance of select areas of the enhanced facial feature.

In another example, an apparatus for generating a texture for a 3D facial model is provided that includes at least one memory and at least one processor coupled to the at least one memory. The at least one processor is configured to: obtain a first frame, the first frame including a first portion of a face; generate a 3D facial model based on the first frame; generate a first facial feature corresponding to the first portion of the face; obtain a second frame, the second frame including a second portion of the face, wherein the second portion of the face at least partially overlaps the first portion of the face; generate a second facial feature corresponding to the second portion of the face; and combine the first facial feature with the second facial feature to generate an enhanced facial feature, wherein the combining is performed to enhance an appearance of select areas of the enhanced facial feature.

In another example, a non-transitory computer-readable medium is provided that has stored thereon instructions that, when executed by one or more processors, cause the one or more processors to: obtain a first frame, the first frame including a first portion of a face; generate a 3D facial model based on the first frame; generate a first facial feature corresponding to the first portion of the face; obtain a second frame, the second frame including a second portion of the face, wherein the second portion of the face at least partially overlaps the first portion of the face; generate a second facial feature corresponding to the second portion of the face; and combine the first facial feature with the second facial feature to generate an enhanced facial feature, wherein the combining is performed to enhance an appearance of select areas of the enhanced facial feature.

In another example, an apparatus for generating a texture for a 3D facial model is provided. The apparatus includes: means for obtaining a first frame, the first frame including a first portion of a face; means for generating a 3D facial model based on the first frame; means for generating a first facial feature corresponding to the first portion of the face; means for obtaining a second frame, the second frame including a second portion of the face, wherein the second portion of the face at least partially overlaps the first portion of the face; means for generating a second facial feature corresponding to the second portion of the face; and means for combining the first facial feature with the second facial feature to generate an enhanced facial feature, wherein the combining is performed to enhance an appearance of select areas of the enhanced facial feature.

In some aspects, one or more of the apparatuses described above is or is part of a vehicle (e.g., a computing device of a vehicle), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 3 is a diagram illustrating another example of a 3D modeling system, in accordance with some examples;

DETAILED DESCRIPTION

Figure 1:
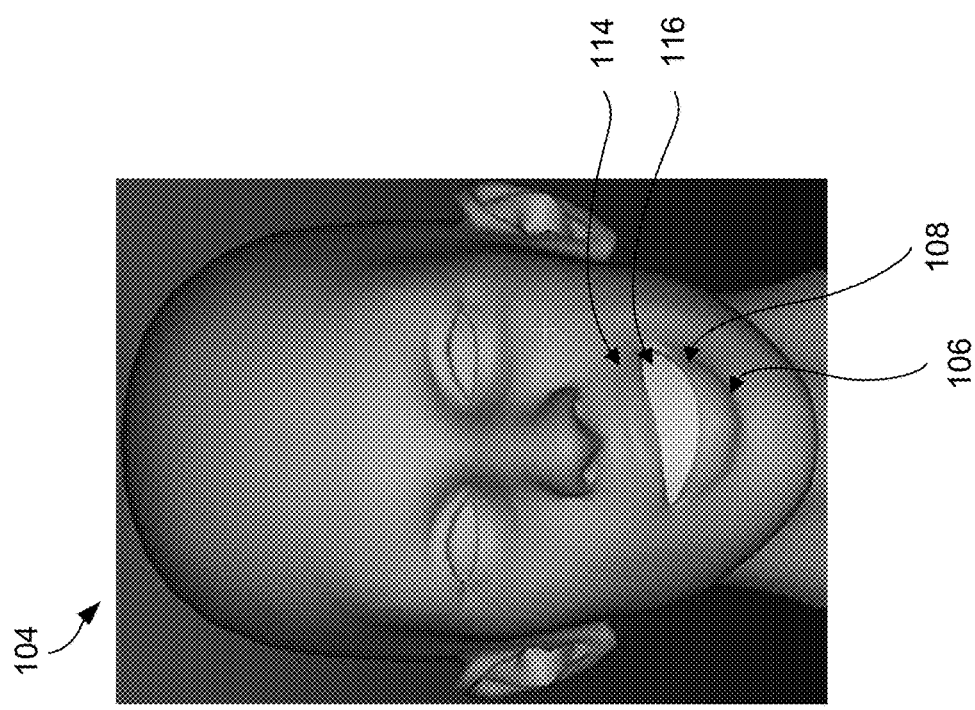
FIG. 1 illustrates an example three-dimensional (3D) facial model and corresponding two-dimensional (2D) facial images overlaid with landmarks projected from the 3D facial model, in accordance with some examples.
Figure 1:
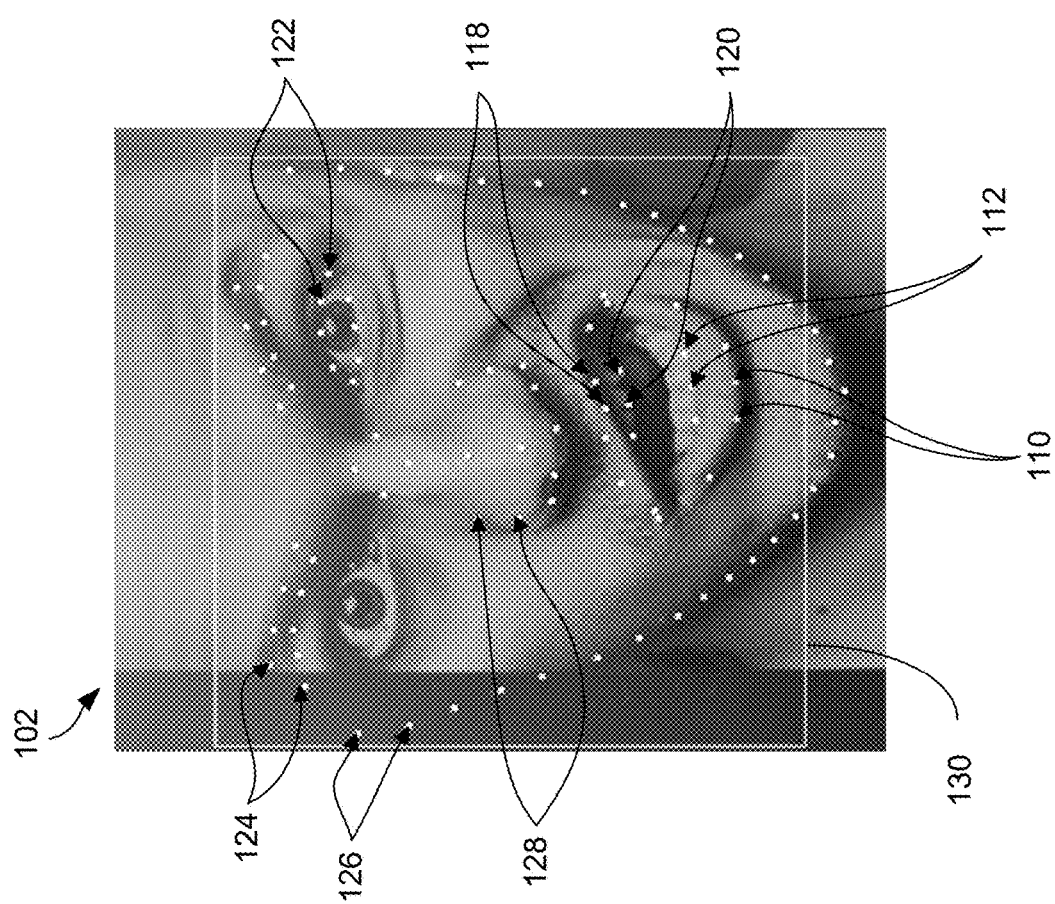

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The generation of three-dimensional (3D) models for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images (also referred to as frames) that include an integration of artificial or virtual graphics with the user's natural surroundings. AR applications allow real images to be processed to add virtual objects to the images or to display virtual objects on a see-through display (so that the virtual objects appear to be overlaid over the real-world environment). AR applications can align or register the virtual objects to real-world objects (e.g., as observed in the images) in multiple dimensions. For instance, a real-world object that exists in reality can be represented using a model that resembles or is an exact match of the real-world object. In one example, a model of a virtual airplane representing a real airplane sitting on a runway may be presented by the display of an AR device (e.g., AR glasses, AR head-mounted display (HMD), or other device) while the user continues to view his or her natural surroundings through the display. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

There is an increasing number of applications that use face data (e.g., for XR systems, for 3D graphics, for security, among others), leading to a large demand for systems with the ability to generate detailed 3D face models (as well as 3D models of other objects) in an efficient and high-quality manner. There also exists a large demand for generating 3D models of other types of objects, such as 3D models of vehicles (e.g., for autonomous driving systems), 3D models of room layouts (e.g., for XR applications, for navigation by devices, robots, etc.), among others. Generating a detailed 3D model of an object (e.g., a 3D face model) typically requires expensive equipment and multiple cameras in an environment with controlled lighting, which hinders large-scale data collection.

Performing 3D object reconstruction (e.g., to generate a 3D model of an object, such as a face model) from one or more images can be challenging. Using a face as an illustrative example of a 3D object, 3D face reconstruction can be difficult based on the need to reconstruct the face geometry (e.g., shape) and the facial expression. In addition, it can be difficult to accurately reconstruct facial expressions for portions of the face that can experience high variations in appearance. In one illustrative example, the eyes of a face can be moved to extreme gaze directions (e.g., looking for to one side, crossing eyes, or the like). In another illustrative example, the upper and lower lips of the mouth of a face are controlled by muscles that allow a large variety of difficult to reconstruct mouth shapes (e.g., smiling, frowning, baring teeth, twisting lips, etc.).

As illustrated in FIG. 1, white dots overlaid on a 2D facial image 102 can represent a projection of 3D vertices of a 3D facial model 104 back onto the original 2D facial image 102 used to generate the 3D facial model 104. For instance, in the illustration of FIG. 1, points corresponding to 3D vertices of major features of the 3D facial model (which can be referred to as landmarks or 2D landmarks) are depicted as white dots. As shown, landmarks 110, 112, 118, 120, 122, 124, 126, 128 are included for the outlines of lips, nose, mouth, eyes, eyebrows, nose, among others. Although the 3D facial model 104 may contain a much larger number of vertices, for purposes of illustration, only a small number of projected 3D vertices corresponding to the above listed facial features are shown. In the illustrated example of FIG. 1, landmarks corresponding to the inner contour 108 of the lower lip of the 3D facial model 104 projected onto a 2D image can include landmarks 112. Similarly, the landmarks corresponding to the outer contour 106 of the lower lip of the 3D facial model 104 can include landmarks 110.

FIG. 1 also illustrates the outer contour 114 and inner contour 116 of the upper lip of the 3D facial model 104. In some examples, landmarks corresponding to the outer contour 114 of the upper lip can include landmarks 118 and 124 and landmarks corresponding to the inner contour 116 of the upper lip can include landmarks 120. Additional landmarks projected from the 3D facial model 104 can include landmarks 122 corresponding to the left eye, landmarks 124 corresponding to the right eyebrow, landmarks 126 corresponding to the overall face outline, and landmarks 128 corresponding to the nose. As noted above, each of the landmarks 114, 116, 120, 122, 124, 126, and 128 can result from a projection of the 3D facial model 104 onto the 2D facial image 102.

FIG. 1 illustrates a two-dimensional (2D) facial image 102 and a corresponding 3D facial model 104 generated from the 2D facial image 102 using a 3D morphable model (3DMM). In some aspects, the 3D facial model 104 can include a representation of a facial expression in the 2D facial image 102. In one illustrative example, the facial expression representation can be formed from blendshapes. Blendshapes can semantically represent movement of muscles or portions of facial features (e.g., opening/closing of the jaw, raising/lowering of an eyebrow, opening/closing eyes, etc.). In some cases, each blendshape can be represented by a blendshape coefficient paired with a corresponding blendshape vector.

In some examples, the 3D facial model 104 can include a representation of the facial shape in the 2D facial image 102. In some cases, the facial shape can be represented by a facial shape coefficient paired with a corresponding facial shape vector. In some implementations a 3D model engine (e.g., a machine learning model) can be trained (e.g., during a training process) to enforce a consistent facial shape (e.g., consistent facial shape coefficients) for a 3D facial model regardless of a pose (e.g., pitch, yaw, and roll) associated with the 3D facial model. For example, when the 3D facial model is rendered into a 2D image for display, the 3D facial model can be projected onto a 2D image using a projection technique. While a 3D model engine that enforces a consistent facial shape independent of pose, the projected 2D image may have varying degrees of accuracy based on the pose of the 3D facial model captured in the projected 2D image.

Figure 2:
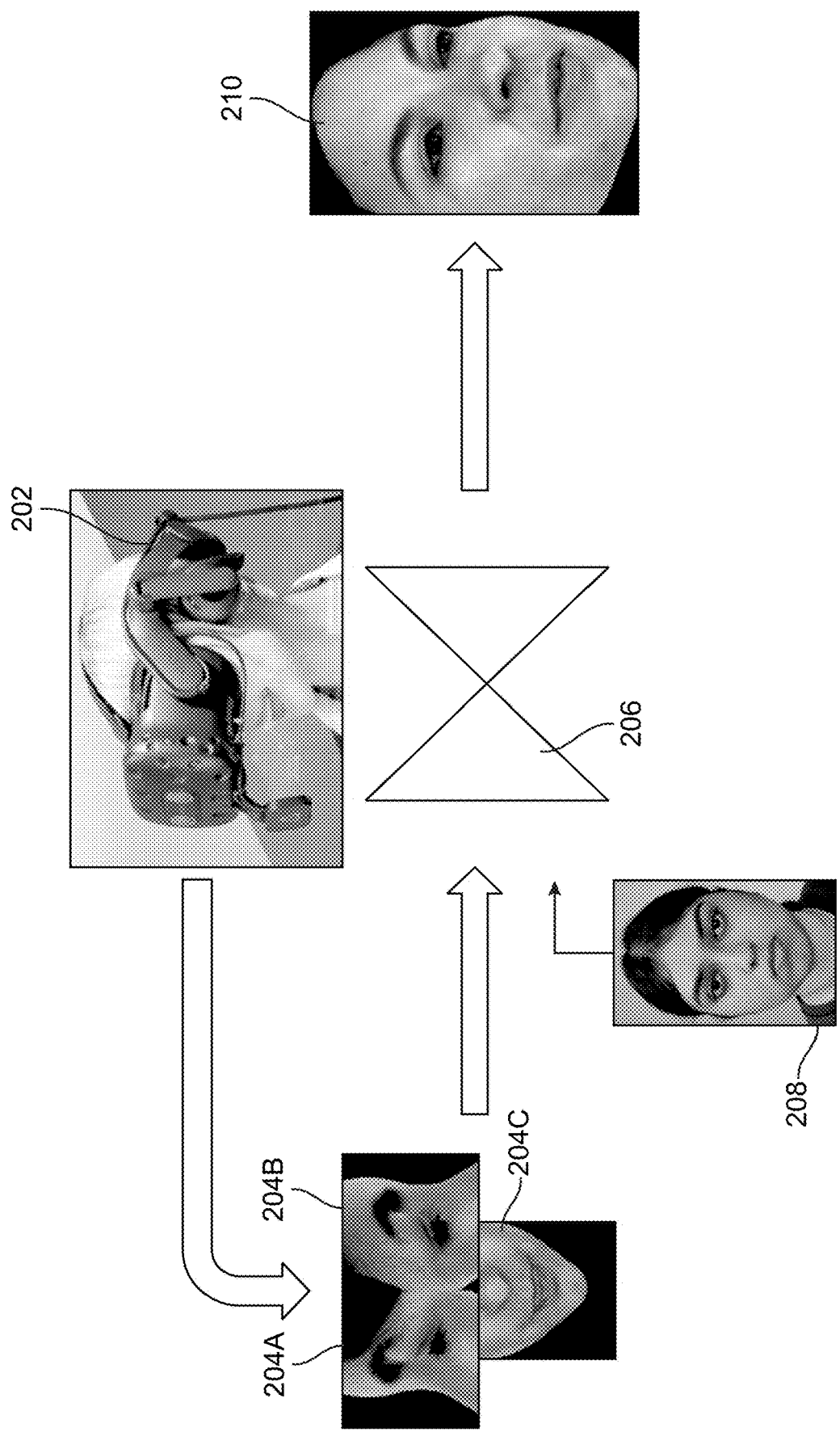
FIG. 2 illustrates an example head mounted XR system with user facing cameras for generating a 3D facial model, in accordance with some examples.

As shown in FIG. 2, the 3D model generator can utilize input frames such as oblique frames 204A, 204B, 204C, and/or 208 to generate the 3D facial model 210. As shown in FIG. 2, the 3D model fitting engine 206 can also generate and/or apply a texture to the underlying 3D model (e.g., the 3D facial model 104 of FIG. 1) to provide a digital representation of the user wearing the head mounted XR system 202. In one illustrative example, a 3D morphable model (3DMM) can be used to represent the geometry of the user's head. In some cases, a 3DMM may lack capability to accurately reproduce the inner mouth and eyeballs of the user. In some cases, the resulting 3D facial model 210 can produce unrealistic results in the eye and mouth regions.

In some implementations, a highly detailed 3D facial model (not shown) can be generated using expensive camera equipment that captures an individual's face from multiple angles. In some cases, the 3D facial model can also be manually edited by skilled artists to produce an accurate depiction of an individual. The process of generating such a highly detailed 3D facial model results in only a single model for the specific individual and does not provide a flexible framework for generating 3D models for any individual without advanced preparation of the detailed 3D facial model.

Systems and techniques are needed for generating accurate 3D facial models for a wide variety of facial expressions that do not require highly detailed 3D facial models specifically tailored to an individual to generate accurate representations of facial features.

Systems, apparatuses, processes (or methods), and computer-readable media (collectively referred to as "systems and techniques") are described herein for generating a 3D model of a particular portion of an object from a video (e.g., a video having a Red (R), Green (G), Blue (B) format, referred to as an RGB video) including a sequence of frames or from one or more images (e.g., grayscale images or RGB images). In some examples, as described in more detail below, the systems and techniques can generate a 3D model of an object (e.g., a 3D model of a face of a person) based on one or more frames depicting the object. The systems and techniques can determine local feature information for generating accurate depictions of specific portions of a face (e.g., mouth, eyes). The systems and techniques can combine (e.g., using image fusion, inpainting, or the like) the local feature information with features of a full facial model to produce a more accurate depiction of the user. In some examples, the systems and techniques can train a machine learning model with training data to generate local UV textures based on input frames. In some cases, the systems and techniques can train a machine learning model to combine features from a full facial representation (also referred to herein as a global features) with one or more local features (e.g., features for the eyes and/or mouth) to generate a synthesized 3D facial model. In some examples, the combining is performed to enhance the appearance of select areas of the face (e.g., areas corresponding to the local features).

While faces are used herein as illustrative examples of objects that can be modeled, the systems and techniques described herein can be applied to generate models for any type of objects. Furthermore, eyes and mouth are used herein as illustrative examples of local feature regions for illustrative purposes. However, one of ordinary skill will appreciate that the systems and techniques described herein can be performed for other local portions of a face. In one illustrative example, similar systems and techniques can be applied to the eyebrows, nose, ears, or any other portion of the face. Similar techniques utilizing local feature generation can also be used with other times of objects in addition to faces.

Figure 3:
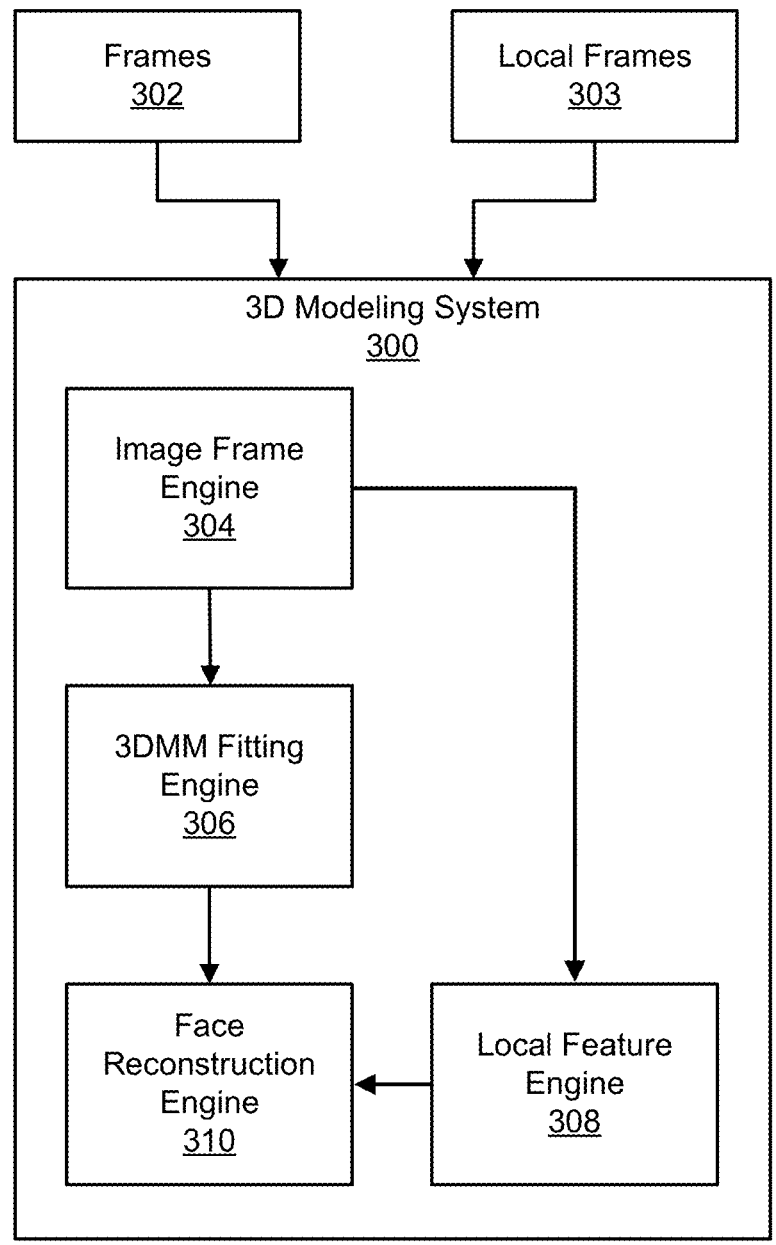
FIG. 3 is a diagram illustrating an example of a 3D modeling system, in accordance with some examples.

Various aspects of the techniques described herein will be discussed below with respect to the figures. FIG. 3 is a diagram illustrating an example of a 3D modeling system 300 that can generate a 3D model (e.g., a 3D morphable model (3DMM)) using at least one image frame 302. The 3D modeling system 300 also obtains local frames (e.g., frames from a user facing camera of the head mounted XR system 202 of FIG. 2). As shown in FIG. 3, the 3D modeling system 300 includes an image frame engine 304, a 3D model fitting engine 306, and a face reconstruction engine 310. While the 3D modeling system 300 is shown to include certain components, one of ordinary skill will appreciate that the 3D modeling system 300 can include more components than those shown in FIG. 3. The components of the 3D modeling system 300 can include software, hardware, or one or more combinations of software and hardware. For example, in some implementations, the components of the 3D modeling system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the 3D modeling system 300.

The image frame engine 304 can obtain or receive an image frame 302 and/or local frames 303 captured by an image sensor, from storage, from memory, from an external source (e.g., a server, an external memory accessed via a network, or other external source), or the like. In some cases, the image frame can be included in a sequence of frames (e.g., a video, a sequence of standalone or still images, etc.). In one illustrative example, each frame of the sequence of frames can include a grayscale component per pixel. Other examples of frames include frames having red (R), green (G), and blue (B) components per pixel (referred to as an RGB video including RGB frames), luma, chroma-blue, chroma-red (YUV, YCbCr, or Y'CbCr) components per pixel and/or any other suitable type of image. The sequence of frames can be captured by one or more cameras, obtained from storage, received from another device (e.g., a camera or device including a camera), or obtained from another source. In some implementations, the image frame engine 304 can convert the image frame 302 to grayscale. The image frame engine 304 can, in some cases, crop a portion of the image frame 302 that corresponds to a face. In some examples, the image frame engine 304 can perform a face detection process and/or face recognition process to detect and/recognize a face within the image frame 302. The image frame engine 304 can generate or apply a bounding box (e.g., bounding box 130 shown in FIG. 1) around the face and can crop out the image data within the bounding box to generate an input image for the 3D model fitting engine 306.

The 3D model fitting engine 306 can receive an input image (e.g., the image frame 302, the cropped bounding box around the face in the image frame 302, etc.) from the image frame engine 304. Using the input image, the 3D model fitting engine 306 can perform a 3D model fitting technique to generate a 3D model (e.g., a 3DMM model) of the face (which can include the head of the person in the image frame 302). The 3D model fitting technique can include solving for shape coefficients $a_i$ and expression coefficients $b_j$. In some examples, the 3D model fitting can include solving for positional information related to the object. In the example of the object being a head of a person, the positional information may include pose information related to a pose of the head. For example, the pose information may indicate an angular rotation of the head with respect to a neutral position of the head. The rotation may be along a first axis (e.g., a yaw axis), a second axis (e.g., a pitch axis), and/or a third axis (e.g., a roll axis). In some cases, the 3D model fitting can also include a focal length for projection of the 3D model onto a 2D image using any suitable projection technique. In some examples, a weak perspective model can use the focal length produced by the 3D model fitting engine 306 to project the 3D vertices of the 3D model (e.g., the 3DMM) onto a 2D image. In some examples, a full perspective model can use the focal length produced by the 3D model fitting engine 306 to project the 3D vertices of the 3D model (e.g., the 3DMM) onto a 2D image.

The local feature engine 308 can receive one or more input frames (e.g., local frames 303) from the image frame engine 304. In some implementations, the local feature engine 308 can be implemented as a machine learning model (e.g., a deep learning neural network). In some examples, the machine learning model can be trained to generate local textures for portions of the face such as the eyes and the mouth that can be combined with a full facial texture for the 3DMM generated by the 3D model fitting engine 306. In one example, the local frames 303 can include oblique frames 204A, 204B, 204C captured by user facing cameras on a head mounted XR system as illustrated in FIG. 2.

Figure 4A:
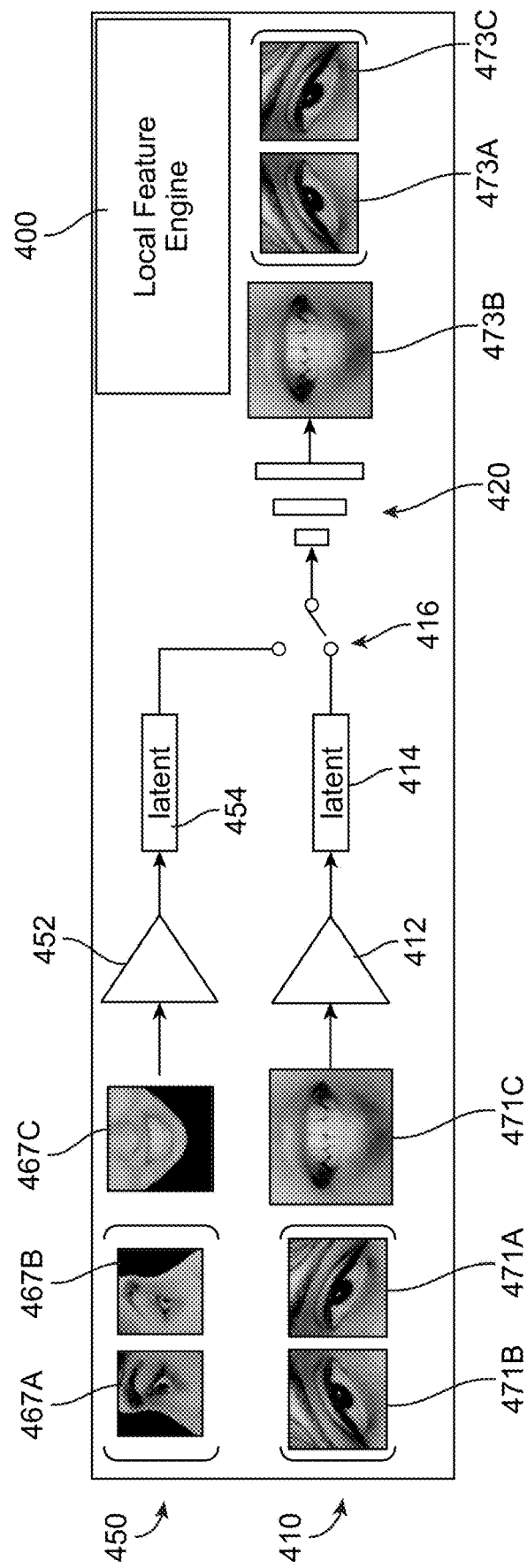
FIG. 4A is a block diagram illustrating training a non-oblique branch of a local feature engine, in accordance with some examples.
Figure 4B:
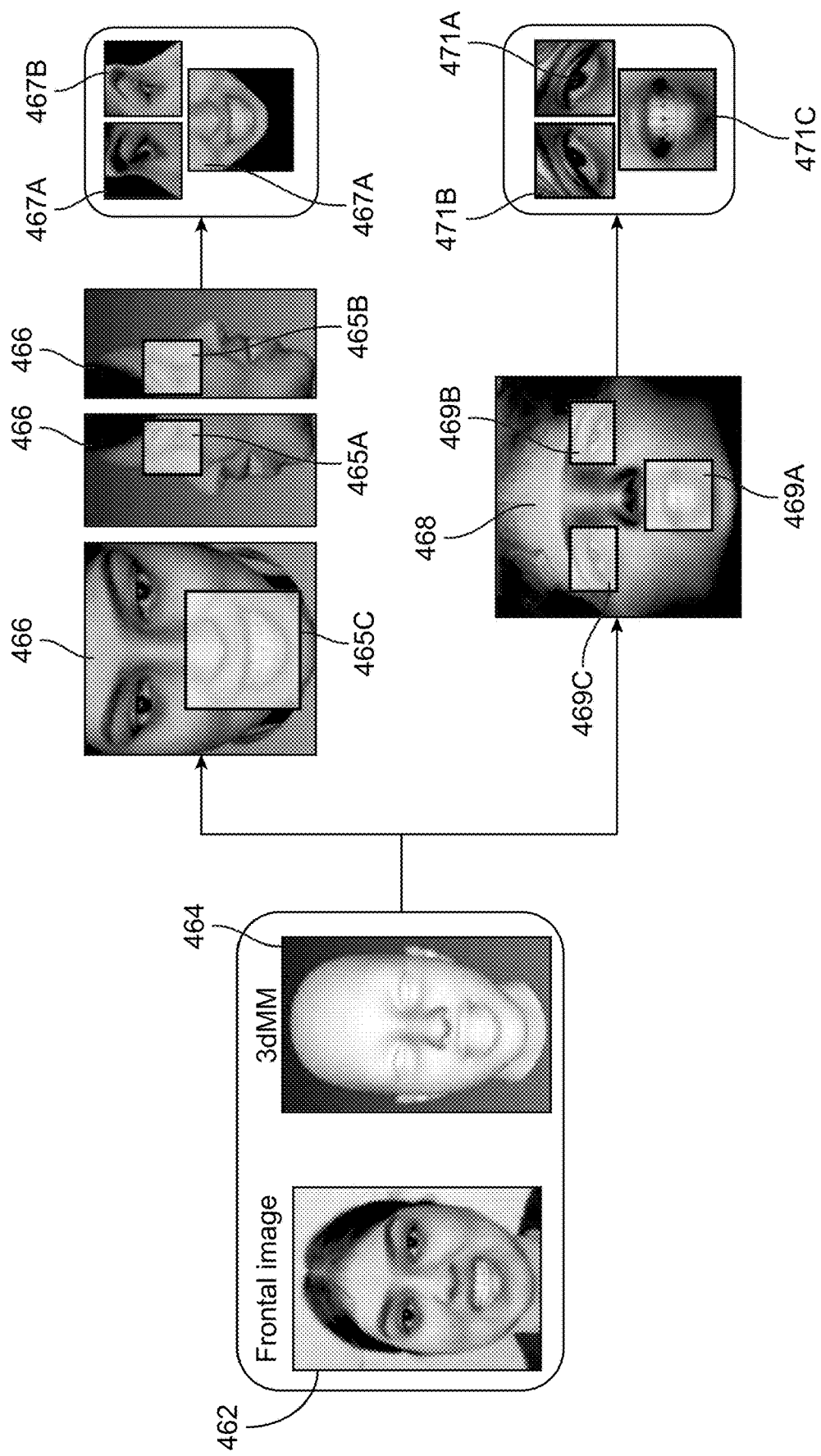
FIG. 4B illustrates an example technique for generating training data for training a local feature engine, in accordance with some examples.
Figure 4C:
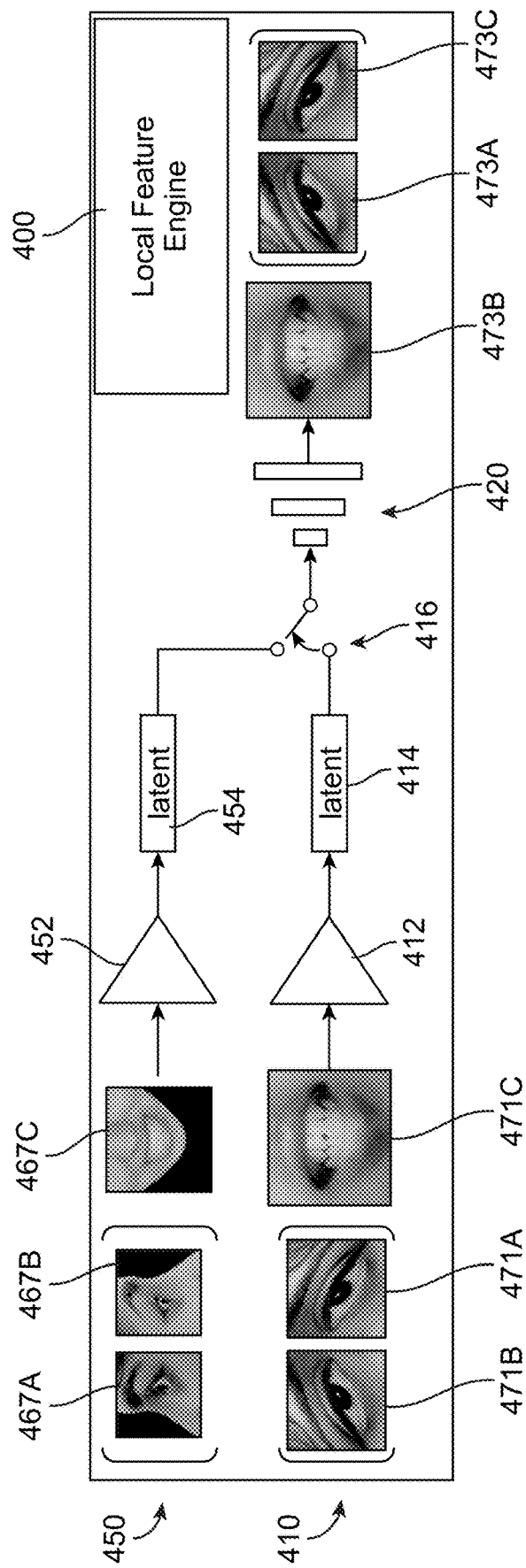
FIG. 4C is a block diagram illustrating training an oblique branch of a local feature engine, in accordance with some examples.

Referring to FIGS. 4A through 4C, an example training process for training a local feature engine (e.g., local feature engine 308 of FIG. 3). In the illustrated example of FIG. 4A, the local feature engine 400 includes two separate branches. In one illustrative example, the local feature engine 400 can utilizes a variational autoencoder architecture (VAE). In some cases, a variational autoencoder can be trained to generate a latent vector (also referred to herein as latent code) that provides a statistical representation of a training dataset. In the VAE architecture, an encoder (e.g., encoders 412, 452) can encode the input data (e.g., input frames), and a decoder (e.g., decoder 420) can generate output data (e.g., output frames). In some cases, the VAE architecture can be trained to generate output frames that are similar to the input frames. During training, the VAE can be configured to generate latent code (e.g., latent code 414, 454) representing the training dataset. In some implementations, the VAE can be configured to generate a latent code 414, 454 that includes assumptions about the underlying distribution of the input data. In one illustrative example, the latent code 414, 454 can be generated assuming the input data has a continuous, gaussian distribution. In the illustrated example of FIG. 4A, a non-oblique branch 410 and an oblique branch 450 are shown in the local feature engine 400. Both the non-oblique branch 410 and the oblique branch 450 include encoders 412, 452 and latent code 414, 454. In the illustrated example, a decoder 420 is shared by the two branches 410, 450 and a switch 416 can select which of the two branches 410, 450 provides data to the decoder 420. In some implementations, the desired output local UV textures 473A, 473B, 473C of the local feature engine 400 can be localized regions in the UV texture space that can be used to provide additional information of the appearance of the eyes and mouth.

Referring to FIG. 4B, and illustrative example technique for generating training data for training the two branches 410, 450 is illustrated. In the example of FIG. 4B, a frontal image 462 can be used to generate a 3DMM 464 using traditional 3DMM generation techniques (e.g., by the 3D model fitting engine 306). In some cases, the frontal image 462 can be aligned with the 3DMM 464 and applied as a texture to provide a 3D representation of the face depicted in the frontal image. As illustrated, the textured 3DMM 466 can rendered and can be rotated to be viewed at arbitrary angles by a virtual camera (not shown). As illustrated, the virtual camera can be configured to capture regions 465A, 465B, 465C of the textured 3DMM 464 such as the left eye, right eye, and mouth. Corresponding oblique frames 467A, 467B, 467C of the left eye, right eye, and mouth, respectively, can be used as training data for the oblique branch 450 of FIG. 4A.

In some implementations, during training, a UV face position map 468 (also referred to as a UV texture or UV position map) can be generated for 3DMM 464 that includes a face. In some cases, the UV face position map 468 can provide and/or represent a 2D map of the face in the input image. For instance, the UV face position map can be a 2D image that records and/or maps the 3D positions of points (e.g., pixels) in UV space (e.g., 2D texture coordinate system). The U in the UV space and the V in the UV space can denote the axes of the UV face position map (e.g., the axes of a 2D texture of the face). In one illustrative example, the U in the UV space can denote a first axis (e.g., a horizontal X-axis) of the UV face position map and the V in the UV space can denote a second axis (e.g., a vertical Y-axis) of the UV face position map. In some examples, the UV position map can record, model, identify, represent, and/or calculate a 3D shape, structure, contour, depth and/or other details of the face (and/or a face region of the head). In some examples, the 3DMM 464 with the texture provided from the UV face position map 468 can be used to render a 3D digital representation of the frontal image 462. In some implementations, a machine learning model (e.g., a neural network) can be used to generate the UV face position maps.

As shown in the illustrated example, the position of the eyes and mouth in the UV face position map 468 can be fixed at locations 469A, 469B, and 469C corresponding to the left eye, right eye, and mouth, respectively. In some cases, the UV face position map 468 (e.g., the UV texture) can be cropped to generate non-oblique input frames 471A, 471B, 471C corresponding to the left eye, right eye, and mouth respectively. The oblique input frames 467A, 467B, 467C and non-oblique input frames 471A, 471B, 47C can be generated for a large number of faces and facial expressions to create a training dataset for training the non-oblique branch 410 and the oblique branch 450 of the local feature engine 400. In on illustrative example, the oblique frames 467A, 467B, 467C can be generated to simulate frame that can be provided by user facing cameras of a head mounted device such as the head mounted XR system 202 of FIG. 2.

Returning to FIG. 4A, in some implementations, the non-oblique branch 410 can be trained prior to training the oblique branch 450. For example, in FIG. 4A, the desired output of the local feature engine 400 is one or more cropped UV texture of a partial region of the full face (also referred to herein as a local UV texture). The non-oblique branch 410 can be trained to generate output images that are local UV textures 473A, 473B, 473C identical to the non-oblique input frames 471A, 471B, 471C. In some cases, training the non-oblique branch 410 including the encoder 412, latent code 414, and decoder 420 can benefit from the desired output images being identical to the input training images of a training dataset. For example, training the non-oblique branch 410 first may speed of convergence of the machine learning model parameters (e.g., weights and/or biases) by limiting the variability between input frames (e.g., 471A, 471B, 47C) and output local UV textures 473A, 473B, 473C. In contrast, the oblique input frames 467A, 467B, 467C are rotated with a different orientation relative to the desired local UV textures 473A, 473B, 473C resulting in additional variation that must be accounted for during the training process of the local feature engine 400. After the non-oblique branch 410 is trained, the latent code 414 can provide a compact representation of the encoded non-oblique input frames 471A, 471B, 471C. For example, each of the input frames may have a dimension of 256 pixels×256 pixels×3 colors (e.g., red, green, and blue). In some cases, the latent code 414 can be trained to represent facial frames using a latent code vector including 256 features.

In some cases, a training dataset of non-oblique frames 471A, 471B, 471C can be provided as input to non-oblique branch for 410 for multiple iterations (also referred to as epochs). In some examples, a backpropagation training process can be performed to adjust the weights (and in some cases other parameters, such as biases) of the nodes of the neural networks (e.g., non-oblique branch 410). As described in more detail with respect to FIG. 8, backpropagation can include a forward pass, a loss function, a backward pass, and a weight update. The forward pass, loss function, backward pass, and parameter update can be performed for each training iteration (e.g., for each batch of data from the training set or for the entire training data set). The backpropagation process can be repeated for a certain number of iterations for each set of training data until the weights of the parameters of non-oblique branch 410 are accurately tuned.

During training, a loss function can be used to penalize errors in the output local UV textures 473A, 473B, 473C generated by the VAE (e.g., the encoder 412, latent code 414, and decoder 420) of the non-oblique branch 410. In one illustrative example, the oblique branch can be trained with a reconstruction loss function $L_{rec\text{-}Eye/Mouth}$ as shown in Equation (1) below:

$$L_{rec\text{-}local} = w_1 \cdot L_1(I_{syn}, I_{gt}) + w_2 \cdot L_{VGG}(I_{syn}, I_{gt}) \quad (1)$$

where $I_{syn}$ is a synthesized output image, $I_{gt}$ is the ground truth image (e.g., the input frames 471A, 471B, 471C), and $L_1$ and $L_{VGG}$ are loss functions combined in a weighted sum according to values of weighting coefficients $w_1$ and $w_2$. In one illustrative example, the weighting coefficient values can be $w_1=25$ and $w_2=5$. The $L_1$ loss is illustrated in Equation (2) below.

$$L_1 = \Sigma |I_{gt} - I_{syn}| \quad (2)$$

The Very Deep Convolutional Network (VGG) loss function $L_{VGG}$ utilizes a neural network that can provide a measure of content and/or style loss between the input frames (e.g., 467A, 467B, 467C, 471A, 471B, 471B) and output images (e.g., 473A, 473B, 473C) produced by the two branches 410, 450 of the local feature engine 400. In one illustrative example, a pretrained VGG neural network including 19 convolutional layers (e.g., a VGG19 convolutional network) can be used. Further details of the VGG19 network are described in Karen Simonyan et al., "Very Deep Convolutional Networks for Large Scale Image Reconstruction," 2014.

In some implementations, a Kullback-Leibler (KL) loss $L_{KL}$ can be used to directly penalize the latent code 414 of the oblique branch during training as illustrated in Equation (3) below:

$$L_{KL} = -0.5 \times [2 \log \sigma + 1 + \sigma^2 - \mu^2] \quad (3)$$

In some implementations, the $L_{KL}$ loss can be used to force the statistical distribution within the latent code to be close to a normal distribution.

For the oblique branch 450, an overall loss function can be a weighted sum of the reconstruction loss $L_{rec\text{-}local}$ and KL loss $L_{KL}$ as shown in Equation (4) below:

$$L_{oblique} = w_3 \cdot L_{rec\text{-}local} \pm w_4 \cdot L_{KL} \quad (4)$$

where $w_3$ and $w_4$ are weighting coefficients. In one illustrative example, the weighting coefficient values can be $w_3=1$ and $w_4=0.01$.

Referring to FIG. 4C, after training the non-oblique branch 410, the local feature engine 400 can select the oblique branch 450 through the switch 416. In some implementations, during a phase of training the oblique branch 450, the parameters of the decoder 420 can be fixed. The loss function used to train the non-oblique network can include reconstruction loss $L_{rec\text{-}local}$ as shown in Equation (1) as well as KL loss $L_{KL}$ as shown in Equation (3). In addition, a code loss L code can be used to constrain the latent code 454 of the of the oblique branch to be close to the latent code 414 of the non-oblique branch 410 previously trained as described above. An example code loss is shown in Equation (5) below:

$$L_{code} = L_2(z_{oblique}, z_{non\text{-}oblique}) \quad (5)$$

Where $z_{oblique}$ is the vector represented in the latent code 454 of the oblique branch 450 and $z_{non\text{-}oblique}$ is the vector represented in the latent code 414 of the non-oblique branch.

The $L_2$ loss is illustrated in Equation (6) below.

$$L_2 = \Sigma(I_{gt} - I_{syn})^2 \quad (6)$$

The overall loss function for the non-oblique branch 410 is shown in Equation (7) below:

$$L_{non\text{-}oblique} = w_5 \cdot L_{rec\text{-}local} + w_6 \cdot L_{KL} + w_7 \cdot L_{code} \quad (7)$$

where $w_5$, $w_6$, and $w_7$ are weighting coefficients. In one illustrative example, the weighting coefficient values can be $w_5=1$, $w_6=0.01$ and $w_7=2.5$.

In some cases, during training of the non-oblique branch 450, the encoder 452 can learn to encode the oblique frames 467A, 467B, and 467C into the non-oblique views of the UV texture as shown by output local UV textures 473A, 473B, 473C.

In some cases, a training dataset of oblique frames 467A, 467B, 467C can be provided as input to non-oblique branch for 410 for multiple iterations (also referred to as epochs). In some examples, a backpropagation training process can be performed to adjust the weights (and in some cases other parameters, such as biases) of the nodes of the neural networks (e.g., non-oblique branch 410). As described in more detail with respect to FIG. 8, backpropagation can include a forward pass, a loss function, a backward pass, and a weight update. The forward pass, loss function, backward pass, and parameter update can be performed for each training iteration (e.g., for each batch of data from the training set or for the entire training data set). The backpropagation process can be repeated for a certain number of iterations for each set of training data until the weights of the parameters of non-oblique branch 410 are accurately tuned. After training, the latent code 454 can provide a compact representation of the encoded oblique input frames 467A, 467B, 467C. For example, each of the input frames may have a dimension of 256 pixels×256 pixels×3 colors (e.g., red, green, and blue). In some cases, the latent code 454 can be trained to represent facial images using a latent code vector including 256 features.

During inference (e.g., after training is complete), the oblique branch can receive oblique frames (e.g., from user facing cameras of a head mounter XR system) and produce non-oblique cropped UV textures for local facial features such as the mouth and eyes. In some implementations, non-oblique branch 410 of the local feature engine 400 can be disabled and/or discarded during inference. In some cases, the output of the local feature engine 400 to generate a UV texture for the full face.

Returning to FIG. 3, the face reconstruction engine 310 can receive the coefficients generated by the 3D model fitting engine 306 to generate the 3D model (e.g., the 3DMM). The 3D model can be generated or constructed as a linear combination of a mean face (sometimes referred to as a neutral face), facial shape basis vectors, and facial expression basis vectors. The mean face can represent an average face that can be transformed (e.g., by the shape basis vectors and expression basis vectors) to achieve the desired final 3D face shape of the 3D model. The facial shape basis vectors can be used to scale proportions of the mean face. In some cases, the facial shape basis vectors may be used to represent a fat or thin face, a small or large nose, and any adjustment to the basic facial shape. In some implementations, the facial shape basis vectors are determined based on principal component analysis (PCA). In some cases, the facial expression basis vectors can represent facial expressions, such as smiling, lifting an eyebrow, blinking, winking, frowning, etc.

One illustrative example of facial expression basis vectors are blendshapes. As used herein, a blendshape can correspond to an approximate semantic parametrization of all or a portion of a facial expression. For example, a blendshape can correspond to a complete facial expression, or correspond to a "partial" (e.g., "delta") facial expression. Examples of partial expressions include raising one eyebrow, closing one eye, moving one side of the face, etc. In one example, an individual blendshape can approximate a linearized effect of the movement of an individual facial muscle. In some cases, the semantic representation can be modeled to correspond with movements of one or more facial muscles.

A 3D model S generated using a 3D model fitting technique (e.g., a 3DMM generated using a 3DMM fitting technique) can be a statistical model representing 3D geometry of an object (e.g., a face). For instance, a 3D model (e.g., a 3DMM) can be represented by a linear combination of a mean face $S_0$ with basis terms (also referred to as basis vectors) for facial shape $U_i$ and facial expressions $V_j$ with coefficients for facial shape a t and facial expressions $b_j$, for example, as follows:

$$S = S_0 + \Sigma_{i=1}^{M} a_i \cdot U_i + \Sigma_{j=1}^{N} b_j \cdot V_j \quad (8)$$

In the example of Equation (1), there are M facial shape coefficients $a_i$ and M facial shape basis vectors $U_i$ where M is an integer greater than or equal to 1. In some implementations, each of the mean face $S_0$, facial shape basis vectors $U_i$, and facial expression vectors $V_j$ can include position information for 3D vertices (e.g., x, y, and z coordinates) that can be combined to form the 3D model S. In some implementations, facial shape basis vectors $U_i$, and facial expression vectors $V_j$ can be expressed as positional offsets from the mean face $S_0$, where the coefficients for facial shape $a_i$ and facial expressions $b_j$ provide a scaling factor for corresponding offset vectors. In one illustrative example, the 3D model S includes three thousand 3D vertices. In one illustrative example, M is equal to 219, which corresponds to 219 facial shape basis vectors $U_i$ and facial shape coefficients $a_i$. In some implementations, the shape basis vectors $U_i$ can include principal component analysis eigenvectors. In some cases, there are N facial expression coefficients $b_j$ and N facial expression basis vectors where N is an integer greater than or equal to 1. In some cases, the facial expression vectors $V_j$ can include blendshape vectors. In one illustrative example, N is equal to 39, which corresponds to 39 facial expression basis vectors $V_j$ and 39 facial expression coefficients $b_j$ (e.g., 39 blendshapes and 39 blendshape coefficients). In some cases, the result of the linear combination shown in Equation (1) can be a 3D model (e.g., a 3DMM) of a face in a neutral pose. In some examples, the 3D model can be rotated with pose information such as yaw, pitch, and roll values to match the pose of the face in the image frame 302.

In some implementations, the face reconstruction engine 310 can generate a UV face position map (also referred to as a UV position map or UV texture) for an input image frame 302 that includes a face. In some examples, the local UV textures output by the local feature engine 400 can be combined with full face features represented in a texture map generated by the face reconstruction engine 310 to improve the quality of the appearance of the portions of the face represented in the local UV textures (e.g., the mouth and eyes). In some cases, the UV face position map can be applied as a texture to the 3DMM generated by the 3D model fitting engine 306. In some examples, the 3DMM with the texture provided from the UV face position map can be used to render a 3D digital representation of the input image. In some implementations, a machine learning model (e.g., a neural network) can be used to generate the UV face position map.

Figure 5A:
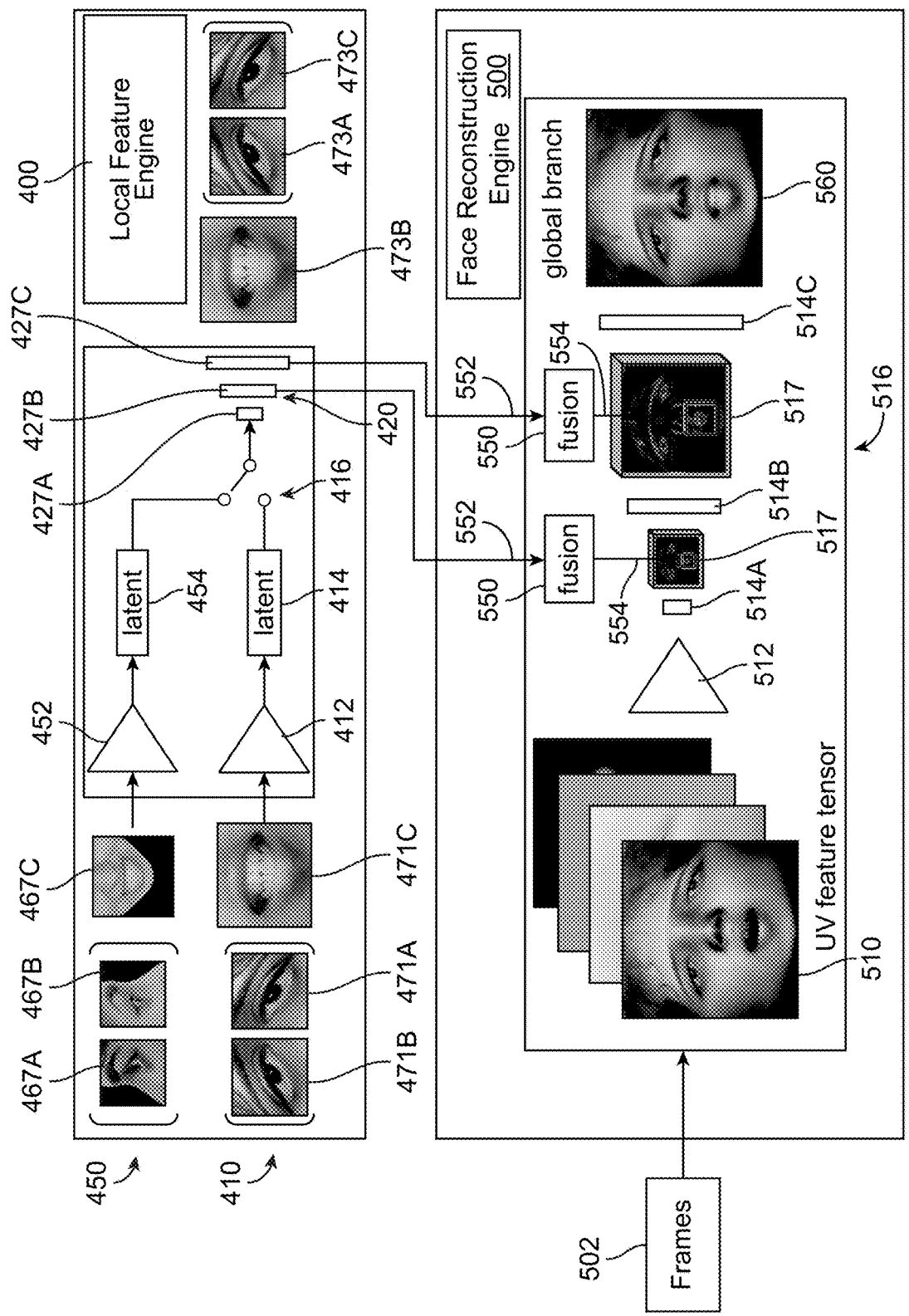
FIG. 5A is a block diagram illustrating an example face reconstruction engine, in accordance with some examples.

FIG. 5A illustrates an example configuration for a face reconstruction engine 500 that can combine local features from the local feature engine 400 with a full face UV texture. In some cases, combining the local features from the local feature engine 400 with the full face UV texture can be used to enhance the appearance of portions of the full face corresponding to portions of the face corresponding to the local features (e.g., left eye, right eye, and/or mouth). In some cases, the face reconstruction engine 500 of FIG. 5A can correspond to the face reconstruction engine 310 of FIG. 3. As described above, the face reconstruction engine 500 can receive input frames 302 of a face and generate a 3DMM and corresponding full face UV feature tensor 510. In the illustrated example of FIG. 5A, a machine learning model including an encoder 512 and a decoder 516 can receive the full face UV feature tensor 510 as input and generate a combined UV texture 560 as an output. In addition, the face reconstruction engine 500 can include fusion engines 550 that can combine the local UV textures 473A, 473B, 473C generated by the local feature engine 400 with the full face features determined based on the full face UV feature tensor 510 to generate a combined UV texture 560 that includes additional detail provided by the local feature engine 400.

In one illustrative example, (not shown), the local UV textures 473A, 473B, 473C output by the local feature engine 400 can be used to directly replace corresponding pixel positions of the full face UV texture generated by the face reconstruction engine 500. However, directly replacing the local texture can result in artifacts at the boundary between the replaced pixels and the original pixels of the full face UV texture. In the illustrated example of FIG. 5A, feature fusion engines 550 can be used to combine local intermediate features 552 from the local feature engine 400 (e.g., features at different resolutions between layers 427A, 427B, 427C of the decoder 420) with global intermediate features 517 from the decoder 516 (e.g., features at different resolutions between layers 514A, 514B, 514C) to produce a combined UV texture 560 as an output. In some cases, combining the local textures with the full face UV texture can enhance portions of select areas (e.g., left eye, right eye, and/or mouth) of the combined UV texture.

Figure 5B:
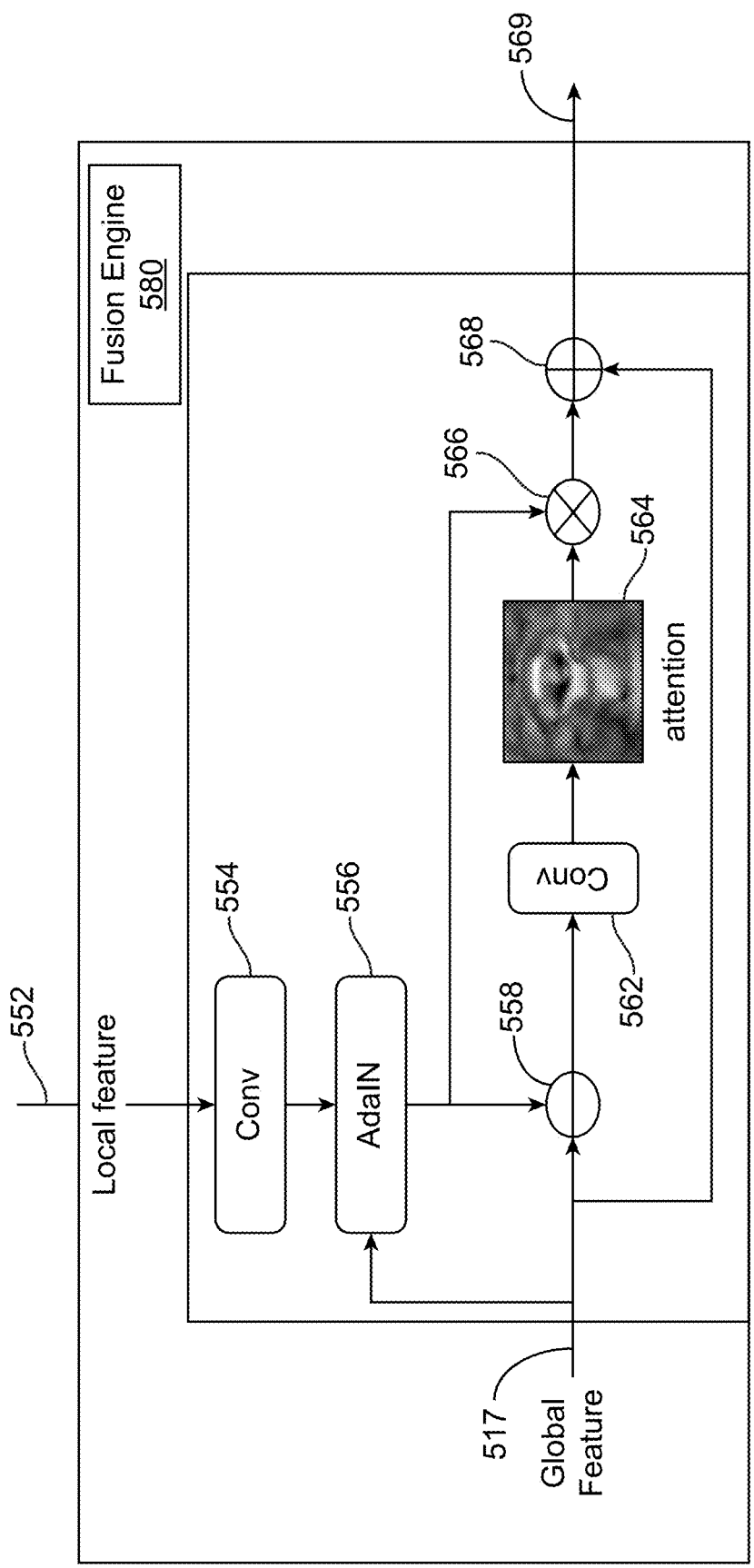
FIG. 5B is a block diagram illustrating an example fusion block, in accordance with some examples.

FIG. 5B illustrates an example system diagram of a fusion engine 580. In the illustrated example, the intermediate feature 552 from the local feature engine 400 is received by a convolution layer 554 and an output of the convolutional layer 554 is received by adaptive instance normalization (AdaIN) block 556. The AdaIN block can adjust the distribution of the local intermediate features 552 to match the distribution of the global intermediate features 517. In one illustrative example, the AdaIN block 556 can subtract the mean of the local intermediate features 552 and divide the mean-subtracted local intermediate features 552 by its variance to normalize the local intermediate features 552 (e.g., with a gaussian distribution). In some cases, the AdaIN block 556 can multiply the normalized local intermediate features 552 by the variance of the global intermediate feature 517 and add the mean of the global intermediate feature 517. In some cases, the AdaIN block 556 can match the style of the local intermediate features 552 to the style of the global intermediate features 517.

The output of the AdaIN block 556 can be subtracted from the global feature 517 at difference block 558 and the difference between the global intermediate features 517 and output of the AdaIN block 556 can be received by a convolutional layer 562. The output of the convolutional layer 562 can be used to generate an attention map 564. In some cases, the attention map can be used to determine the weighting for combining the local intermediate features 552 with the global intermediate features 517. Based on the determined weightings from the generated attention map, the global intermediate features 517 and local intermediate features 552 can be scaled at the multiplication block 566 according to the determined weights and added together at the addition block 568. The resulting output of the addition block 568 can be a combined feature 569. In some cases, the attention map can determine weights based on the input global intermediate features 517 and local intermediate features 552 that provide the best overall appearance of the combined feature. It should be understood that more or fewer components can be included in a fusion engine 550 without departing from the scope of the present disclosure. In some cases, other techniques besides a weighted sum can be used for generating the combined feature 569. In one illustrative example, an alpha blending technique can be used to combine the global intermediate features 517 with the local intermediate features 552.

Returning to FIG. 5A, the face reconstruction engine 500 can include fusion engines 550 between multiple layers of the decoder 516 to combine local intermediate features 552 and global intermediate features 517 at different resolutions to produce combined intermediate features at multiple stages of the decoder 516.

In some cases, a training dataset of oblique frames 467A, 467B, 467C and/or input frames 502 can provided as input to local feature engine 400 and face reconstruction engine 500, respectively for multiple iterations (also referred to as epochs). In one illustrative example, the training dataset can include oblique frames captured by a multi-view camera system. In some examples, a backpropagation training process can be performed to adjust the weights (and in some cases other parameters, such as biases) of the nodes of the neural networks (e.g., oblique branch 450 of local feature engine 400, face reconstruction engine 500). As described in more detail with respect to FIG. 8, backpropagation can include a forward pass, a loss function, a backward pass, and a weight update. The forward pass, loss function, backward pass, and parameter update can be performed for each training iteration (e.g., for each batch of data from the training set or for the entire training data set). The backpropagation process can be repeated for a certain number of iterations for each set of training data until the weights of the parameters of local feature engine 400 and face reconstruction engine 500 are accurately tuned.

During training, a loss function can be used to penalize errors in the combined UV texture 560 produced by the face reconstruction engine 500. In some implementations, the loss function can include a reconstruction loss for the whole face and reconstruction losses for local regions (e.g., corresponding to local UV textures 473A, 473B, 473C) can be used. An example reconstruction loss for the whole face is shown in Equation (9) below:

$$L_{rec\text{-}Face} = w_8 \cdot L_1(I_{syn}, I_{gt}) + w_9 \cdot L_{VGG}(I_{syn}, I_{gt}) + w_{10} \cdot L_{MS\text{-}SSIM}(I_{syn}, I_{gt}) \quad (9)$$

where $I_{syn}$ is a synthesized output image of the face reconstruction engine 500 (e.g., combined UV texture 560), $I_{gt}$ is the ground truth image (e.g., the input frame 502), $w_8$, $w_9$, and $w_{10}$ are weighting coefficients. In one illustrative example, the weighting coefficient values can be $w_8=50$, $w_9=10$, and $w_{10}=1$. In addition to $L_1$ and $L_{VGG}$ described above with respect to Equations (1) and (7), a multi-scale structure similarity (MS-SSIM) loss function can be used to detect image degradation.

In addition to the full face loss function, a similar loss function can be applied to each of the cropped local images generated by the oblique branch 450 of the local feature engine 400 as shown in Equation (10):

$$L_{rec\text{-}local} = w_{11} \cdot L_1(C_{syn}, C_{gt}) + w_{12} \cdot L_{VGG}(C_{syn}, C_{gt}) + w_{13} \cdot L_{MSSSIM}(C_{syn}, C_{gt}) \quad (10)$$

In some implementations, the face reconstruction engine 500 can also be trained utilizing a deep generative neural network model (e.g., generative adversarial network (GAN)). A GAN is a form of generative neural network that can learn patterns in input data so that the neural network model can generate new synthetic outputs that reasonably could have been from the original dataset. A GAN can include two neural networks that operate together. One of the neural networks (referred to as a generative neural network or generator denoted as $G(z)$) generates a synthesized output, and the other neural network (referred to as a discriminative neural network or discriminator denoted as $D(X)$) evaluates the synthesized output for authenticity (whether the synthesized output is from an original dataset, such as the training dataset, or is generated by the generator). The generator $G(z)$ can correspond to the face reconstruction engine 310 and/or face reconstruction engine 500. The generator is trained to try and fool the discriminator into determining a synthesized video frame (or group of video frames) generated by the generator is a real video frame (or group of video frames) from a training dataset (e.g., the first group of training video data). The training process continues, and the generator becomes better at generating the synthetic video frames that look like real video frames. The discriminator continues to find flaws in the synthesized video frames, and the generator figures out what the discriminator is looking at to determine the flaws in the images. Once the network is trained, the generator is able to produce realistic looking video frames that the discriminator is unable to distinguish from the real video frames.

In one illustrative example, a GAN can generate facial textures and the goal of the GAN is to generate facial textures with local texture fusion. There is a dueling aspect between the generator G and the discriminator D that is maximized with respect to the parameters of the discriminator D. The discriminator D will try to discriminate between real facial textures (from a group of training data) and fake facial textures (generated by the generator G based on the second group of training video data) as well as possible, and the generator G should minimize the ability of the discriminator D to identify fake images. Parameters of the generator G (e.g., weights of the nodes of the neural network and in some cases other parameters, such as biases) can be adjusted during the training process so that the generator G will output video frames that are indistinguishable from real video frames associated with the second domain. A loss function can be used to analyze errors in the generator G and discriminator D. In one illustrative example, a binary cross-entropy loss function can be used. Other loss functions can be used in some cases.

In some implementations, the generator G of the GAN can be trained using the loss function shown in Equation (11) below:

$$L_{LSGAN}(G) = E_{x \sim p_{data}(x)}(D(GUV_{feat})) - 1)^2 \quad (11)$$

Where UV feat is a UV feature tensor (e.g., UV feature tensor 510 of FIG. 5A), $E_{x \sim p_{data}(x)}$ computes expectation for synthesized images x (e.g., synthesized textures) in the training dataset, and $p_{data}(x)$ is the distribution of the synthesized images in the training dataset.

In some implementations, the generator G of the GAN can be trained using the loss function shown in Equation (12) below:

$$L_{LSGAN}(D) = E_{y \sim p_{data}(y)}(D(I_{gt}) - 1)^2 + E_{x \sim p_{data}(x)}(D(I_{syn}))^2 \quad (12)$$

Where $E_{y \sim p_{data}(y)}$ computes the expectation for real images y (e.g., ground truth images) in the training dataset, $p_{data}(y)$ is the probability distribution of the real images, $I_{gt}$ denotes real images, and $I_{syn}$ denotes synthesized images.

$$L_{Mask} = -\Sigma_l \text{mean}(|\text{AttentionMap}_l|) \quad (13)$$

Where l represents the layers of the generator network (e.g., 514A, 514B, 514C of FIG. 5A). As noted above with respect to FIG. 5A, fusion of local features (e.g., from local feature engine 308 of FIG. 3 and/or local feature engine 400 of FIG. 4A) with global features (e.g., from the global branch of face reconstruction engine 500) can be performed at multiple layers of the generator network.

$$L_{Total} = L_{rec\text{-}WholeFace} + L_{rec\text{-}Eye/Mouth} + L_{LSGAN}(D) + 10^{-5} \cdot L_{Mask} \quad (14)$$

The 3D modeling system 300 illustrated in FIG. 3 illustrates a functional block diagram that can be implemented in hardware, software, or any combination of the hardware and software. As an example, the functional blocks illustrated can use the illustrated relationships to identify functional blocks that can be converted into a universal modeling language (UML) diagram to identify an example implementation of the 3D modeling system 300 at least partially as an object oriented arrangement in software. However, the 3D modeling system 300 can be implemented without abstractions and, for example, as static functional implementations. In some examples, the 3D modeling system 300 can be implemented in whole or in part by a computing device or system with the architecture of computing system 900 shown in FIG. 9.

Figure 6:
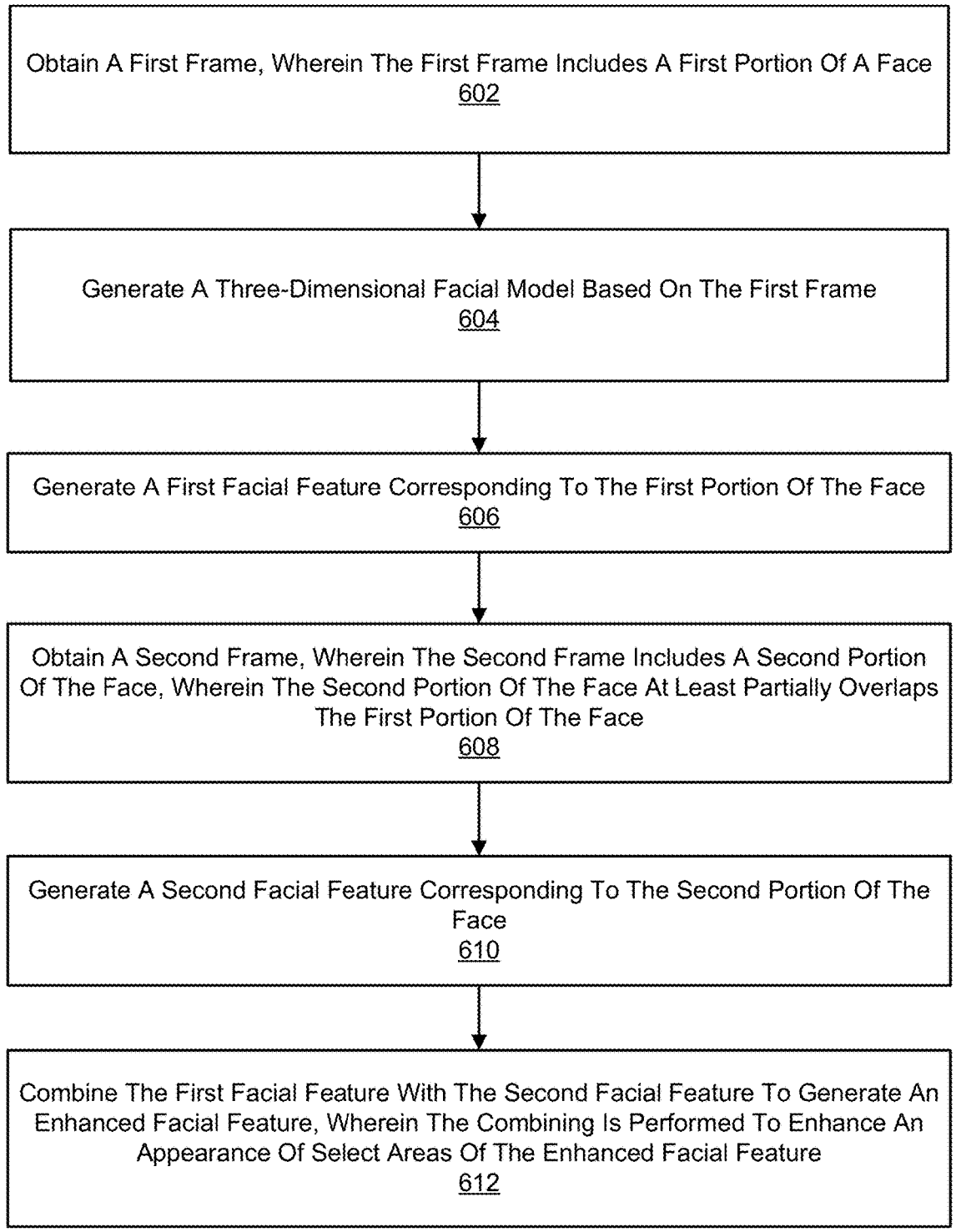
FIG. 6 is a flow diagram illustrating an example of a process for training a 3D model, in accordance with some examples.

FIG. 6 illustrates a flowchart of a process 600 for generating a texture for a 3D facial model. At block 602, the process 600 includes obtaining a first frame, the first frame including a first portion of a face. In some cases, the first frame is a frontal image of a face in a neutral pose. At block 604, the process 600 includes generating a 3D facial model based on the first frame. In one illustrative example, the 3DMM fitting engine 306 of FIG. 3 can generate the 3D facial model.

At block 606, the process 600 includes generating a first facial feature corresponding to the first portion of the face. In one illustrative example, the face reconstruction engine 310 of FIG. 3 can generate the first facial feature.

At block 608, the process 600 includes obtaining a second frame, the second frame including a second portion of the face. In some cases, the second portion of the face at least partially overlaps the first portion of the face. In some aspects, the first portion of the face includes a frontal depiction of a whole face and the second portion of the face includes a local region of the face, less than the frontal depiction of the whole face. In some examples, the second frame is obtained from a user facing camera of a head mounted device. For example, the second frame can include an image of a left eye, a right eye, and/or a mouth.

At block 610, the process 600 includes generating a second facial feature corresponding to the second portion of the face.

At block 612, the process 600 includes combining the first facial feature with the second facial feature to generate an enhanced facial feature. In some examples, the combining is performed to enhance an appearance of select areas of the enhanced facial feature. combining the first facial feature with the second facial feature includes generating a weighted average of the first facial feature and the second facial feature. In some examples, generating the weighted average of the first facial feature and the second facial feature includes generating an attention map and, based on the attention map, generating weighting coefficients for combining the first facial feature with the second facial feature. In some implementations, combining the first facial feature with the second facial feature comprises combining a first intermediate feature associated with the first facial feature (e.g., intermediate features from layers 514A, 514B, and/or 514C of decoder 516 in FIG. 4A) with a second intermediate feature associated with the second facial feature (e.g., intermediate features from layers 427A, 427B, and/or 427C decoder 420 in FIG. 5A). In some examples, comprising combining a third intermediate feature associated with the first facial feature (e.g., a feature from a different layer 514A, 514B, and/or 514C of decoder 516) with a fourth intermediate feature associated with the second facial feature (e.g., a feature from a different layer 427A, 427B, and/or 427C of decoder 420 of FIG. 5A). In some cases, the first intermediate feature and the second intermediate feature are associated with a first feature resolution and the third intermediate feature and the fourth intermediate feature are associated with a second feature resolution, different from the first feature resolution.

In some examples, the process 600 includes generating a full facial texture associated with the 3D facial model. In some cases, the full facial texture includes the enhanced facial feature.

In some cases, the first facial feature is generated by a first machine learning model and the second facial feature is generated by a second machine learning model, that is different from the first machine learning model. In some cases, the second portion of the face comprises an oblique view of the face and the second facial feature comprises a portion of a full facial UV texture, less than the full facial UV texture. In some examples, the second machine learning model includes a latent vector corresponding to the oblique view of the face. In some aspects, the first machine learning model and the second machine learning model are trained separately.

In some aspects, the process 600 includes obtaining a third frame, the third frame including a third portion of the face that is different from the second portion of the face, generating a third facial feature corresponding to the third portion of the face, obtaining a fourth frame, the fourth frame including a fourth portion of the face that is different from the second portion of the face and the third portion of the face, generating a fourth facial feature corresponding to the fourth portion of the face, and combining the first facial feature with the second facial feature, the third facial feature, and the fourth facial feature. In some examples, the third portion of the face at least partially overlaps the first portion of the face, In some examples, the fourth portion of the face at least partially overlaps the first portion of the face. In some cases, the combining is performed to enhance the appearance of at least one or more of the second portion of the face, the third portion of the face, or the fourth portion of the face. In some examples, the select areas of the enhanced facial feature correspond to a left eye, a right eye, and a mouth.

In other examples, a device may include an application or function to perform some of the processes described herein (e.g., process 600 and/or any other process described herein). In some examples, the processes described herein (e.g., process 600 and/or any other process described herein) may be performed by a computing device or apparatus. In some examples, the process 600 can be performed by the 3D modeling system 300 and/or face reconstruction engine 500 above. In another example, process 600 can be performed by a computing device or system with the architecture of the computing system 900 shown in FIG. 9.

The computing device can include any suitable device, such as a mobile device (e.g., a mobile phone), a desktop computing device, a tablet computing device, an extended reality (XR) device or system (e.g., a VR headset, an AR headset, AR glasses, or other XR device or system), a wearable device (e.g., a network-connected watch or smartwatch, or other wearable device), a server computer or system, a vehicle or computing device of a vehicle (e.g., an autonomous vehicle), a robotic device, a television, and/or any other computing device with the resource capabilities to perform the processes described herein, including the process 600. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
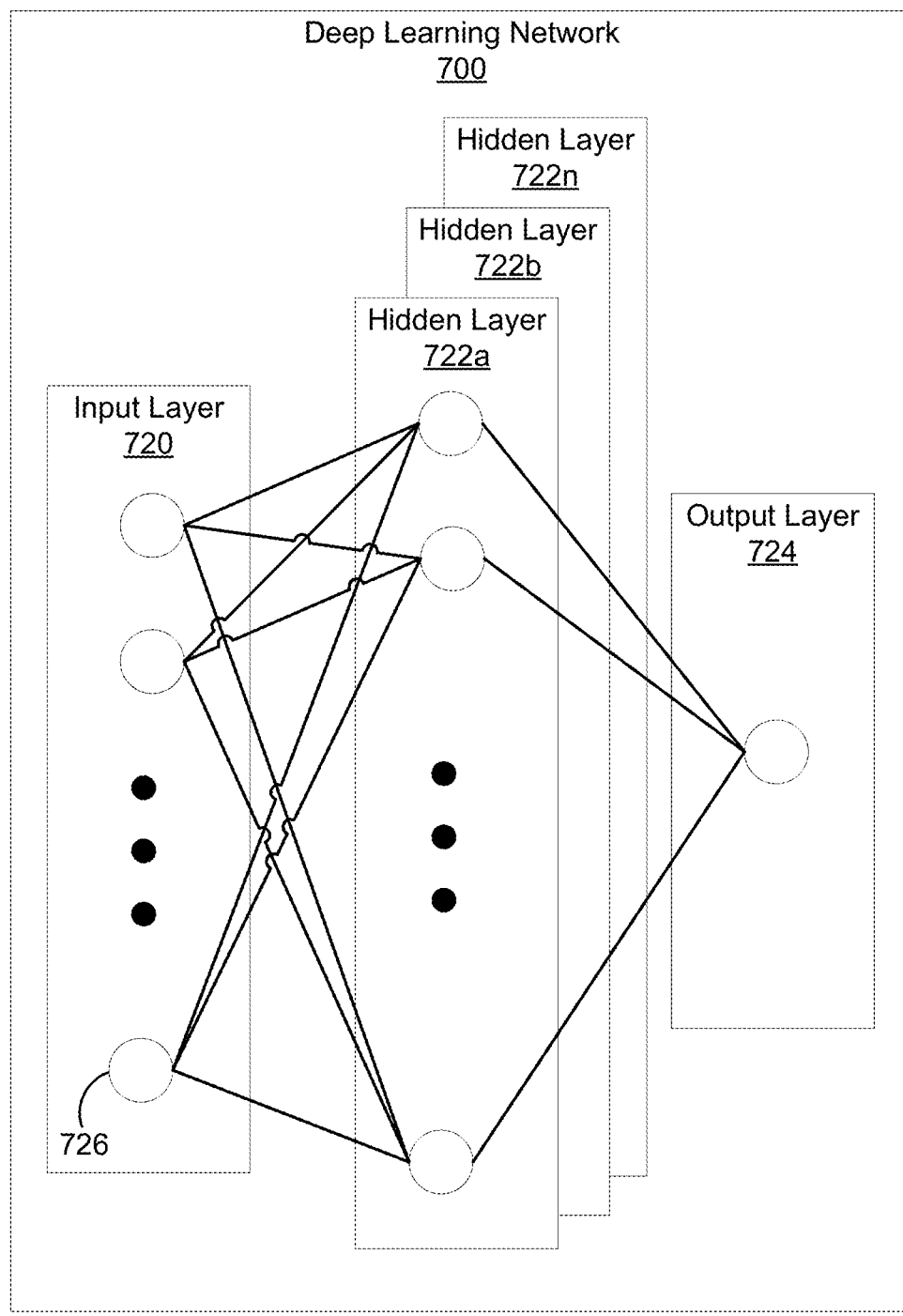
FIG. 7 is a block diagram illustrating an example of a deep learning network, in accordance with some examples.

FIG. 7 is an illustrative example of a deep learning neural network 700 that can be used by a 3D model training system. An input layer 720 includes input data. In one illustrative example, the input layer 720 can include data representing the pixels of an input video frame. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 724 that provides an output resulting from the processing performed by the hidden layers 722a, 722b, through 722n. In one illustrative example, the output layer 724 can provide a classification for an object in an input video frame. The classification can include a class identifying the type of object (e.g., a person, a dog, a cat, or other object).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the hidden layers 722a, 722b, through 722n can transform the information of each input node by applying activation functions to the information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 724, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 724. In an example in which the neural network 700 is used to identify objects in images, the neural network 700 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 700 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying objects in images, the forward pass can include passing a training image through the neural network 700. The weights are initially randomized before the neural network 700 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \Sigma \frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 700 can include any suitable deep network. One example includes a convolutional neural network (CNN), which includes an input layer and an output layer, with multiple hidden layers between the input and out layers. An example of a CNN is described below with respect to FIG. 8. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
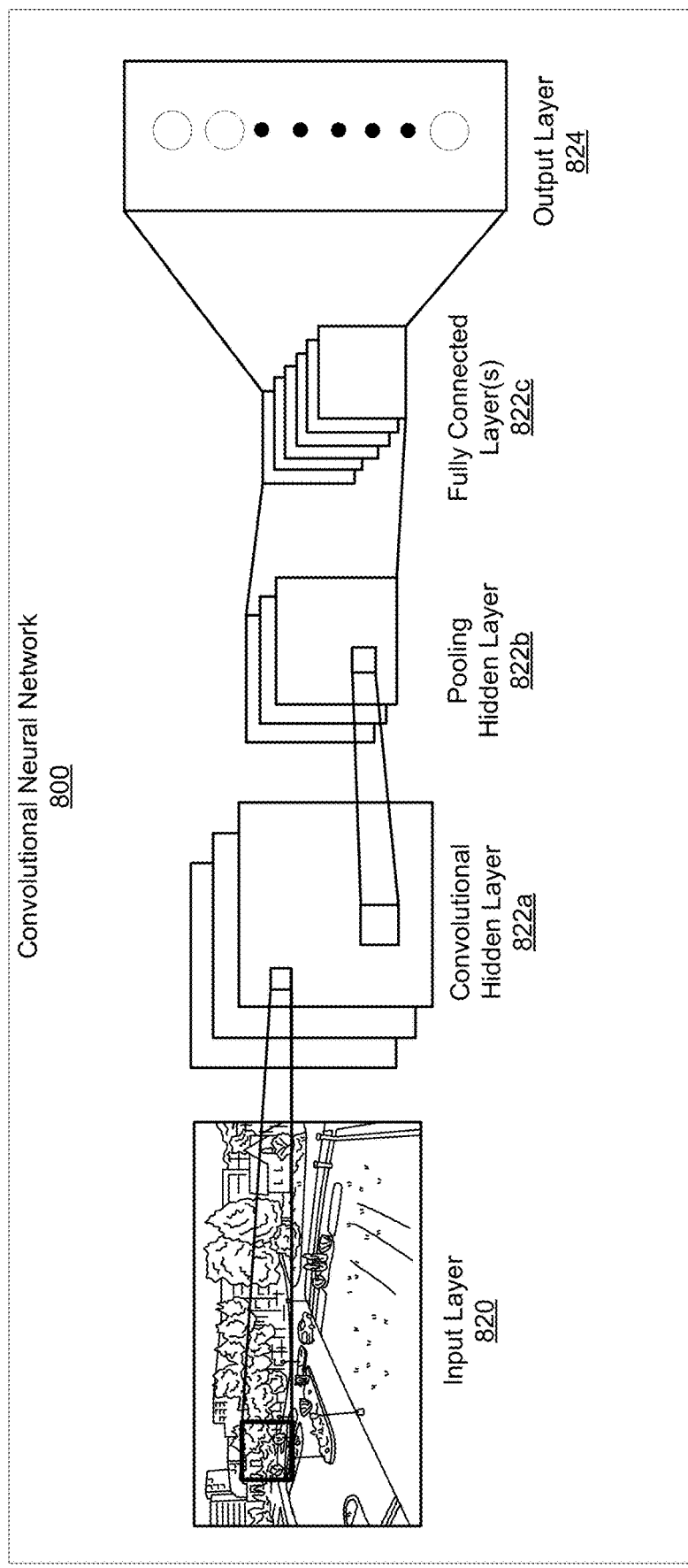
FIG. 8 is a block diagram illustrating an example of a convolutional neural network, in accordance with some examples.

FIG. 8 is an illustrative example of a convolutional neural network 800 (CNN 800). The input layer 820 of the CNN 800 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822b can take each activation map output from the convolutional hidden layer 822a and generates a condensed activation map (or feature map) using a pooling function. Max-pooling is one example of a function performed by a pooling hidden layer. Other forms of pooling functions be used by the pooling hidden layer 822a, such as average pooling, $L_2$-norm pooling, or other suitable pooling functions. A pooling function (e.g., a max-pooling filter, an $L_2$-norm filter, or other suitable pooling filter) is applied to each activation map included in the convolutional hidden layer 822a. In the example shown in FIG. 8, three pooling filters are used for the three activation maps in the convolutional hidden layer 822a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 822a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822a having a dimension of 24×24 nodes, the output from the pooling hidden layer 822b will be an array of 12×12 nodes.

In some examples, an $L_2$-norm pooling filter could also be used. The $L_2$-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, $L_2$-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822b to every one of the output nodes in the output layer 824. Using the example above, the input layer includes 28×28 nodes encoding the pixel intensities of the input image, the convolutional hidden layer 822a includes 3×24×24 hidden feature nodes based on application of a 5×5 local receptive field (for the filters) to three activation maps, and the pooling layer 822b includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822b is connected to every node of the output layer 824.

The fully connected layer 822c can obtain the output of the previous pooling layer 822b (which should represent the activation maps of high-level features) and determines the features that most correlate to a particular class. For example, the fully connected layer 822c layer can determine the high-level features that most strongly correlate to a particular class, and can include weights (nodes) for the high-level features. A product can be computed between the weights of the fully connected layer 822c and the pooling hidden layer 822b to obtain probabilities for the different classes. For example, if the CNN 800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 9:
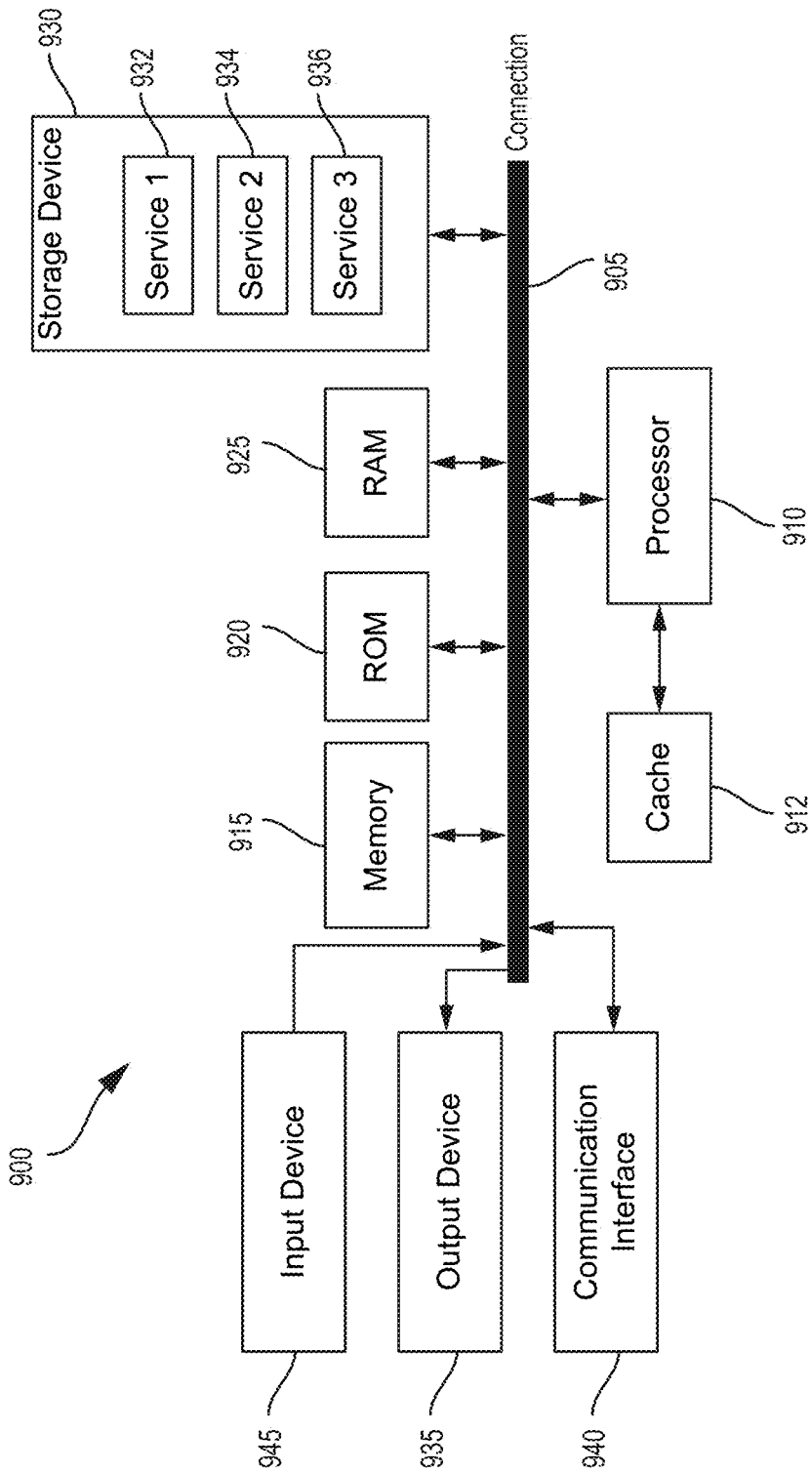
FIG. 9 is a diagram illustrating an example of a system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of generating a texture for a 3D facial model comprising: obtaining a first frame, the first frame including a first portion of a face; generating a 3D facial model based on the first frame; generating a first facial feature corresponding to the first portion of the face; obtaining a second frame, the second frame including a second portion of the face, wherein the second portion of the face at least partially overlaps the first portion of the face; generating a second facial feature corresponding to the second portion of the face; and combining the first facial feature with the second facial feature to generate an enhanced facial feature, wherein the combining is performed to enhance an appearance of select areas of the enhanced facial feature.

Aspect 2. The method of Aspect 1, wherein the first frame is a frontal image of a face in a neutral pose.

Aspect 3. The method of any of Aspects 1 to 2, wherein the second frame is obtained from a user facing camera of a head mounted device.

Aspect 4. The method of any of Aspects 1 to 3, further comprising generating a full facial texture associated with the 3D facial model, wherein the full facial texture includes the enhanced facial feature.

Aspect 5. The method of any of Aspects 1 to 4, wherein the first portion of the face includes a frontal depiction of a whole face and the second portion of the face includes a local region of the face, less than the frontal depiction of the whole face.

Aspect 6. The method of any of Aspects 1 to 5, wherein the second facial feature comprises a local feature associated with at least one or more of an eye or a mouth.

Aspect 7. The method of any of Aspects 1 to 6, wherein combining the first facial feature with the second facial feature comprises generating a weighted average of the first facial feature and the second facial feature.

Aspect 8. The method of any of Aspects 1 to 7, wherein generating the weighted average of the first facial feature and the second facial feature comprises: generating an attention map; and based on the attention map, generating weighting coefficients for combining the first facial feature with the second facial feature.

Aspect 9. The method of any of Aspects 1 to 8, wherein combining the first facial feature with the second facial feature comprises combining a first intermediate feature associated with the first facial feature with a second intermediate feature associated with the second facial feature.

Aspect 10. The method of any of Aspects 1 to 9, further comprising combining a third intermediate feature associated with the first facial feature with a fourth intermediate feature associated with the second facial feature, wherein: the first intermediate feature and the second intermediate feature are associated with a first feature resolution; and the third intermediate feature and the fourth intermediate feature are associated with a second feature resolution, different from the first feature resolution.

Aspect 11. The method of any of Aspects 1 to 10, wherein the first facial feature is generated by a first machine learning model and the second facial feature is generated by a second machine learning model that is different from the first machine learning model.

Aspect 12. The method of any of Aspects 1 to 11, wherein the second portion of the face comprises an oblique view of the face and the second facial feature comprises a portion of a full facial UV texture, less than the full facial UV texture.

Aspect 13. The method of any of Aspects 1 to 12, wherein the second machine learning model comprises a latent vector corresponding to the oblique view of the face.

Aspect 14. The method of any of Aspects 1 to 13, wherein the first machine learning model and the second machine learning model are trained separately.

Aspect 15. The method of any of Aspects 1 to 14, further comprising: obtaining a third frame, the third frame including a third portion of the face that is different from the second portion of the face, wherein the third portion of the face at least partially overlaps the first portion of the face; generating a third facial feature corresponding to the third portion of the face; obtaining a fourth frame, the fourth frame including a fourth portion of the face that is different from the second portion of the face and the third portion of the face, wherein the fourth portion of the face at least partially overlaps the first portion of the face; generating a fourth facial feature corresponding to the fourth portion of the face, and combining the first facial feature with the second facial feature, the third facial feature, and the fourth facial feature, wherein the combining is performed to enhance the appearance of at least one or more of the second portion of the face, the third portion of the face, or the fourth portion of the face.

Aspect 16. The method of any of Aspects 1 to 15, wherein the select areas of the enhanced facial feature correspond to a left eye, a right eye, and a mouth.

Aspect 17: An apparatus for generating a texture for a 3D facial model. The apparatus includes at least one memory (e.g., implemented in circuitry) and a processor (or multiple processors) coupled to the at least one memory. The processor (or processors) is configured to: obtain a first frame, the first frame including a first portion of a face; generate a 3D facial model based on the first frame; generate a first facial feature corresponding to the first portion of the face; obtain a second frame, the second frame including a second portion of the face, wherein the second portion of the face at least partially overlaps the first portion of the face; generate a second facial feature corresponding to the second portion of the face; and combine the first facial feature with the second facial feature to generate an enhanced facial feature, wherein the combining is performed to enhance an appearance of select areas of the enhanced facial feature.

Aspect 18: The apparatus of Aspect 17, wherein the first frame is a frontal image of a face in a neutral pose.

Aspect 19: The apparatus of any of Aspects 17 to 18, wherein the second frame is obtained from a user facing camera of a head mounted device.

Aspect 20: The apparatus of any of Aspects 17 to 19, wherein the processor is configured to: generate a full facial texture associated with the 3D facial model, wherein the full facial texture includes the enhanced facial feature.

Aspect 21: The apparatus of any of Aspects 17 to 20, wherein the first portion of the face includes a frontal depiction of a whole face and the second portion of the face includes a local region of the face, less than the frontal depiction of the whole face.

Aspect 22: The apparatus of any of Aspects 17 to 21, wherein the second facial feature comprises a local feature associated with at least one or more of an eye or a mouth.

Aspect 23: The apparatus of any of Aspects 17 to 22, wherein combining the first facial feature with the second facial feature comprises generating a weighted average of the first facial feature and the second facial feature.

Aspect 24: The apparatus of any of Aspects 17 to 23, wherein the processor is configured to: generate an attention map; and based on the attention map, generate weighting coefficients for combining the first facial feature with the second facial feature.

Aspect 25: The apparatus of any of Aspects 17 to 24, wherein combining the first facial feature with the second facial feature comprises combining a first intermediate feature associated with the first facial feature with a second intermediate feature associated with the second facial feature.

Aspect 26: The apparatus of any of Aspects 17 to 25, wherein the processor is configured to: combine a third intermediate feature associated with the first facial feature with a fourth intermediate feature associated with the second facial feature, wherein: the first intermediate feature and the second intermediate feature are associated with a first feature resolution; and the third intermediate feature and the fourth intermediate feature are associated with a second feature resolution, different from the first feature resolution.

Aspect 27: The apparatus of any of Aspects 17 to 26, wherein the first facial feature is generated by a first machine learning model and the second facial feature is generated by a second machine learning model that is different from the first machine learning model.

Aspect 28: The apparatus of any of Aspects 17 to 27, wherein the second portion of the face comprises an oblique view of the face and the second facial feature comprises a portion of a full facial UV texture, less than the full facial UV texture.

Aspect 29: The apparatus of any of Aspects 17 to 28, wherein the second machine learning model comprises a latent vector corresponding to the oblique view of the face.

Aspect 30: The apparatus of any of Aspects 17 to 29, wherein the first machine learning model and the second machine learning model are trained separately.

Aspect 31: The apparatus of any of Aspects 17 to 30, wherein the processor is configured to: obtain a third frame, the third frame including a third portion of the face that is different from the second portion of the face, wherein the third portion of the face at least partially overlaps the first portion of the face; generate a third facial feature corresponding to the third portion of the face; obtain a fourth frame, the fourth frame including a fourth portion of the face that is different from the second portion of the face and the third portion of the face, wherein the fourth portion of the face at least partially overlaps the first portion of the face; generate a fourth facial feature corresponding to the fourth portion of the face, and combine the first facial feature with the second facial feature, the third facial feature, and the fourth facial feature, wherein the combining is performed to enhance the appearance of at least one or more of the second portion of the face, the third portion of the face, or the fourth portion of the face.

Aspect 32: The apparatus of any of Aspects 17 to 31, wherein the select areas of the enhanced facial feature correspond to a left eye, a right eye, and a mouth.

Aspect 33: A non-transitory computer-readable storage medium having stored thereon instructions which, when executed by one or more processors, cause the one or more processors to perform any of the operations of aspects 1 to 32.

Aspect 34: An apparatus comprising one or more means for performing any of the operations of aspects 1 to 32.

What is claimed is:
1. A method of synthesizing facial features of a three-dimensional (3D) facial model, the method comprising:
obtaining a first frame, the first frame including a face;
generating a 3D facial model based on the first frame;
generating a first texture corresponding to the face;

obtaining a second frame, the second frame including a portion of the face, wherein the portion of the face at least partially overlaps the face;

generating a second texture corresponding to the portion of the face; and combining the first texture with the second texture to generate an enhanced texture, wherein the combining is performed to enhance an appearance of an area of the first texture corresponding to the portion of the face based on the second texture to generate the enhanced texture.

2. The method of claim 1, wherein the first frame is a frontal image of the face in a neutral pose.

3. The method of claim 1, wherein the second frame is obtained from a user facing camera of a head mounted device.

4. The method of claim 1, wherein the first texture includes the portion of the face.

5. The method of claim 1, wherein the first texture includes a frontal depiction of a whole face and the portion of the face includes a local region of the face, less than the frontal depiction of the whole face.

6. The method of claim 1, wherein combining the first texture with the second texture comprises generating a weighted average of the area of the first texture corresponding to the portion of the face and the second texture.

7. The method of claim 6, wherein generating the weighted average of the first texture and the second texture comprises:

generating an attention map; and based on the attention map, generating weighting coefficients for combining the area of the first texture corresponding to the portion of the face with the second texture.

8. The method of claim 1, wherein combining the first texture with the second texture comprises combining the first texture with a feature associated with the portion of the face.

9. The method of claim 8, the method further comprising combining a third feature associated with the face with a fourth feature associated with the portion of the face, wherein:

the first feature and the second feature are associated with a first feature resolution; and the third feature and the fourth feature are associated with a second feature resolution, different from the first feature resolution.

10. The method of claim 1, wherein the first texture is generated by a first machine learning model and the second texture is generated by a second machine learning model that is different from the first machine learning model.

11. The method of claim 10, wherein the portion of the face comprises an oblique view of the face.

12. The method of claim 11, wherein the second machine learning model comprises a latent vector corresponding to the oblique view of the face.

13. The method of claim 10, wherein the first machine learning model and the second machine learning model are trained separately.

14. The method of claim 1, the method further comprising:

obtaining a third frame, the third frame including a first additional portion of the face that is different from the portion of the face, wherein the first additional portion of the face at least partially overlaps the face;

generating a third texture corresponding to the first additional portion of the face;

obtaining a fourth frame, the fourth frame including a second additional portion of the face that is different from the portion of the face and the first additional portion of the face, wherein the second additional portion of the face at least partially overlaps the portion of the face;

generating a fourth texture corresponding to the second additional portion of the face, and combining the first texture with the second texture, the third texture, and the fourth texture, wherein the combining is performed to enhance the appearance of at least one or more of the portion of the face, the first additional portion of the face, or the second additional portion of the face.

15. The method of claim 14, wherein the portion of the face, the first additional portion of the face, and the second additional portion of the face correspond to a left eye, a right eye, and a mouth, respectively.

16. An apparatus for synthesizing facial features of a 3D facial model, comprising:

at least one memory; and at least one processor coupled to the at least one memory and configured to:

obtain a first frame, the first frame including a face;

generate a 3D facial model based on the first frame;

generate a first texture corresponding to the face;

obtain a second frame, the second frame including a portion of the face, wherein the portion of the face at least partially overlaps the face;

generate a second texture corresponding to the portion of the face; and combine the first texture with the second texture to generate an enhanced texture, wherein the combining is performed to enhance an appearance of an area of the first texture corresponding to the portion of the face based on the second texture to generate the enhanced texture.

17. The apparatus of claim 16, wherein the first frame is a frontal image of the face in a neutral pose.

18. The apparatus of claim 16, wherein the second frame is obtained from a user facing camera of a head mounted device.

19. The apparatus of claim 16, wherein the first texture includes the portion of the face.

20. The apparatus of claim 16, wherein the first texture includes a frontal depiction of a whole face and the portion of the face includes a local region of the face, less than the frontal depiction of the whole face.

21. The apparatus of claim 16, wherein, to combine the first texture with the second texture, the at least one processor is configured to generate a weighted average of the area of the first texture corresponding to the portion of the face and the second texture.

22. The apparatus of claim 21, wherein the at least one processor is configured to:

generate an attention map; and based on the attention map, generate weighting coefficients for combining the area of the first texture corresponding to the portion of the face with the second texture.

23. The apparatus of claim 16, wherein, to combine the first texture with the second texture, the at least one processor is further configured to combine the first texture with a feature associated with the portion of the face.

24. The apparatus of claim 23, wherein the at least one processor is configured to:

combine a third feature associated with the face with a fourth feature associated with the portion of the face, wherein:
the first feature and the second feature are associated with a first feature resolution; and
the third feature and the fourth feature are associated with a second feature resolution, different from the first feature resolution.

25. The apparatus of claim 16, wherein the at least one processor is configured to generate the first texture using a first machine learning model and generate the second texture using a second machine learning model that is different from the first machine learning model.

26. The apparatus of claim 25, wherein the portion of the face comprises an oblique view of the face.

27. The apparatus of claim 26, wherein the second machine learning model comprises a latent vector corresponding to the oblique view of the face.

28. The apparatus of claim 25, wherein the first machine learning model and the second machine learning model are trained separately.

29. The apparatus of claim 16, wherein the at least one processor is configured to:
obtain a third frame, the third frame including a first additional portion of the face that is different from the portion of the face, wherein the first additional portion of the face at least partially overlaps the face;
generate a third texture corresponding to the first additional portion of the face;
obtain a fourth frame, the fourth frame including a second additional portion of the face that is different from the portion of the face and the first additional portion of the face, wherein the second additional portion of the face at least partially overlaps the face;
generate a fourth texture corresponding to the second additional portion of the face, and
combine the first texture with the second texture, the third texture, and the fourth texture, wherein the combining is performed to enhance the appearance of at least one or more of the portion of the face, the first additional portion of the face, or the second additional portion of the face.

30. The apparatus of claim 29, wherein the portion of the face, the first additional portion of the face, and the second additional portion of the face correspond to a left eye, a right eye, and a mouth, respectively.

\* \* \* \* \*